US012343995B2

(12) United States Patent
Yumoto et al.

(10) Patent No.: US 12,343,995 B2
(45) Date of Patent: Jul. 1, 2025

(54) LIQUID DISCHARGE HEAD, LIQUID DISCHARGE UNIT, AND LIQUID DISCHARGE APPARATUS

(71) Applicants: Yudai Yumoto, Kanagawa (JP); Takahiro Yoshida, Kanagawa (JP)

(72) Inventors: Yudai Yumoto, Kanagawa (JP); Takahiro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 197 days.

(21) Appl. No.: 18/123,364

(22) Filed: Mar. 20, 2023

(65) Prior Publication Data

US 2023/0302800 A1 Sep. 28, 2023

(30) Foreign Application Priority Data

Mar. 23, 2022 (JP) ................................ 2022-046784
Mar. 28, 2022 (JP) ................................ 2022-051604

(51) Int. Cl.
*B41J 2/155* (2006.01)
*B41J 2/14* (2006.01)

(52) U.S. Cl.
CPC ........... *B41J 2/155* (2013.01); *B41J 2/14233* (2013.01); *B41J 2002/14362* (2013.01); *B41J 2202/12* (2013.01); *B41J 2202/20* (2013.01); *B41J 2202/21* (2013.01)

(58) Field of Classification Search
CPC .................... B41J 2/155; B41J 2/14233; B41J 2002/14362; B41J 2202/12; B41J 2202/20; B41J 2202/21; B41J 2/2114
See application file for complete search history.

(56) References Cited

U.S. PATENT DOCUMENTS

| | | | | |
|---|---|---|---|---|
| 5,790,155 | A * | 8/1998 | Usui | B41J 2/14233 347/68 |
| 10,022,967 | B2 * | 7/2018 | Mizuno | B41J 2/155 |
| 12,076,993 | B2 * | 9/2024 | Cruz-Uribe | B41J 2/155 |
| 2006/0007272 | A1 | 1/2006 | Ogata et al. | |
| 2007/0080978 | A1 | 4/2007 | Yoshida | |
| 2007/0211092 | A1 | 9/2007 | Shingyohuchi et al. | |
| 2008/0024536 | A1 | 1/2008 | Hirano et al. | |
| 2008/0117262 | A1 | 5/2008 | Mori et al. | |

(Continued)

FOREIGN PATENT DOCUMENTS

| | | |
|---|---|---|
| JP | 2002-273878 | 9/2002 |
| JP | 2007-160566 | 6/2007 |
| JP | 2013-173264 | 9/2013 |

*Primary Examiner* — Geoffrey S Mruk
(74) *Attorney, Agent, or Firm* — XSENSUS LLP

(57) ABSTRACT

A liquid discharge head includes: a nozzle plate having multiple nozzles from each of which a liquid is to be discharged; and a gap in each end of the nozzle plate in a longitudinal direction of the nozzle plate. The multiple nozzles are divided into P numbers of sub-nozzle groups, each of the sub-nozzle groups including the multiple nozzles as multiple sub-nozzles, where P is an integer of one or more, the multiple sub-nozzles are arrayed in the longitudinal direction at first intervals of d×P where d is a recording resolution and P is a number of the sub-nozzle groups, the sub-nozzle groups respectively include sub-nozzle rows respectively including the multiple sub-nozzles arrayed at the first intervals of d×P in the longitudinal direction.

12 Claims, 18 Drawing Sheets

(56) References Cited

U.S. PATENT DOCUMENTS

| | | | |
|---|---|---|---|
| 2009/0102907 | A1 | 4/2009 | Yamanaka et al. |
| 2009/0147034 | A1 | 6/2009 | Yoshida |
| 2009/0289975 | A1 | 11/2009 | Yoshida |
| 2012/0236080 | A1 | 9/2012 | Yoshida et al. |
| 2014/0210914 | A1 | 7/2014 | Yoshida et al. |
| 2014/0218428 | A1 | 8/2014 | Araki et al. |
| 2014/0232796 | A1 | 8/2014 | Kimura et al. |
| 2014/0285554 | A1 | 9/2014 | Yanaka et al. |
| 2015/0077469 | A1 | 3/2015 | Kohda et al. |
| 2015/0246533 | A1 | 9/2015 | Nemoto et al. |
| 2015/0246536 | A1 | 9/2015 | Yoshida |
| 2015/0375504 | A1 | 12/2015 | Kitaoka et al. |
| 2016/0082728 | A1 | 3/2016 | Kohda et al. |
| 2016/0096369 | A1 | 4/2016 | Shimizu et al. |
| 2016/0129691 | A1 | 5/2016 | Yoshida |
| 2016/0185113 | A1 | 6/2016 | Yoshida et al. |
| 2016/0297193 | A1 | 10/2016 | Yoshida |
| 2017/0087865 | A1 | 3/2017 | Yoshida et al. |
| 2017/0096015 | A1 | 4/2017 | Odaka et al. |
| 2017/0120602 | A1 | 5/2017 | Nakai et al. |
| 2017/0157924 | A1 | 6/2017 | Otome et al. |
| 2017/0239949 | A1 | 8/2017 | Yoshida |
| 2017/0253062 | A1 | 9/2017 | Murakami et al. |
| 2017/0297333 | A1 | 10/2017 | Kohda et al. |
| 2017/0342286 | A1 | 11/2017 | Yanagawa et al. |
| 2018/0105711 | A1 | 4/2018 | Katoh et al. |
| 2018/0126731 | A1 | 5/2018 | Ishikawa et al. |
| 2018/0154657 | A1 | 6/2018 | Masato et al. |
| 2018/0178538 | A1 | 6/2018 | Miyazawa et al. |
| 2018/0194135 | A1 | 7/2018 | Iwama et al. |
| 2018/0257374 | A1 | 9/2018 | Yoshida et al. |
| 2018/0272709 | A1 | 9/2018 | Iwata et al. |
| 2018/0272730 | A1 | 9/2018 | Odaka et al. |
| 2018/0272739 | A1 | 9/2018 | Sawase et al. |
| 2018/0272740 | A1 | 9/2018 | Otome et al. |
| 2018/0272743 | A1 | 9/2018 | Nakai et al. |
| 2019/0084313 | A1 | 3/2019 | Kohda et al. |
| 2019/0240978 | A1 | 8/2019 | Kawahara et al. |
| 2019/0263119 | A1 | 8/2019 | Odaka et al. |
| 2019/0283414 | A1 | 9/2019 | Yoshida |
| 2020/0086652 | A1 | 3/2020 | Iio et al. |
| 2020/0094573 | A1 | 3/2020 | Kohda et al. |
| 2020/0147961 | A1 | 5/2020 | Yoshida |
| 2020/0164644 | A1 | 5/2020 | Yoneta et al. |
| 2020/0238696 | A1 | 7/2020 | Yoshida |
| 2020/0282740 | A1 | 9/2020 | Kohda et al. |
| 2020/0331262 | A1 | 10/2020 | Andou et al. |
| 2020/0346457 | A1 | 11/2020 | Iwata et al. |
| 2021/0001629 | A1 | 1/2021 | Yoshida |
| 2021/0178776 | A1 | 6/2021 | Kohda et al. |
| 2022/0032621 | A1 | 2/2022 | Yoshida et al. |
| 2022/0169020 | A1 | 6/2022 | Yoshida |

* cited by examiner

COMPARATIVE EXAMPLE

COMPARATIVE EXAMPLE

COMPARATIVE EXAMPLE 10
e
11
X
DISTANCE
(GAP D)
NOZZLE PLATE
LONGITUDINAL
DIRECTION
NOZZLE PLATE
TRANSVERSE
DIRECTION
LIQUID
DISCHARGE
DIRECTION
A
D
101
SBN1
SBN2
12
θ2'
θ1'
11N
1

LIQUID DISCHARGE HEAD, LIQUID DISCHARGE UNIT, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2022-046784, filed on Mar. 23, 2022, and Japanese Patent Application No. 2022-051604, filed on Mar. 28, 2022, in the Japan Patent Office, the entire disclosure of which is hereby incorporated by reference herein.

BACKGROUND

Technical Field

The present embodiment relates to a liquid discharge head, a liquid discharge unit, and a liquid discharge apparatus.

Related Art

A droplet discharge head includes multiple joined head modules in which multiple nozzles for discharging liquid is arranged.

An inkjet head includes multiple arranged actuator units having a parallelogram outer shape.

SUMMARY

A liquid discharge head includes: a nozzle plate having multiple nozzles from each of which a liquid is to be discharged; and a gap in each end of the nozzle plate in a longitudinal direction of the nozzle plate. The multiple nozzles are divided into P numbers of sub-nozzle groups, each of the sub-nozzle groups including the multiple nozzles as multiple sub-nozzles, where P is an integer of one or more, the multiple sub-nozzles are arrayed in the longitudinal direction at first intervals of d×P where d is a recording resolution and P is a number of the sub-nozzle groups, the sub-nozzle groups respectively include sub-nozzle rows respectively including the multiple sub-nozzles arrayed at the first intervals of d×P in the longitudinal direction, and each of the multiple sub-nozzles is arrayed in a first inclination direction inclined relative to the longitudinal direction and a transverse direction orthogonal to the longitudinal direction, and a set of the sub-nozzle rows of the P numbers of the sub-nozzle groups arrayed in one row in the first inclination direction form a nozzle row, multiple nozzle rows including the nozzle row are arrayed in a second inclination direction different from the first inclination direction and inclined relative to the longitudinal direction and the transverse direction, the multiple nozzle rows are arrayed at second intervals X in the second inclination direction, and the gap has: a first gap between one end of the nozzle plate in the longitudinal direction and each of the multiple nozzles adjacent to said one end of the nozzle plate, the first gap has a distance of X or more in the second inclination direction, and a second gap between another end of the nozzle plate in the longitudinal direction and each of the multiple nozzles adjacent to said another end of the nozzle plate, the second gap has a distance of X or more in the second inclination direction.

BRIEF DESCRIPTIONS OF DRAWINGS

A more complete appreciation of embodiments of the present disclosure and many of the attendant advantages and features thereof can be readily obtained and understood from the following detailed description with reference to the accompanying drawings, wherein.

Figure 1:
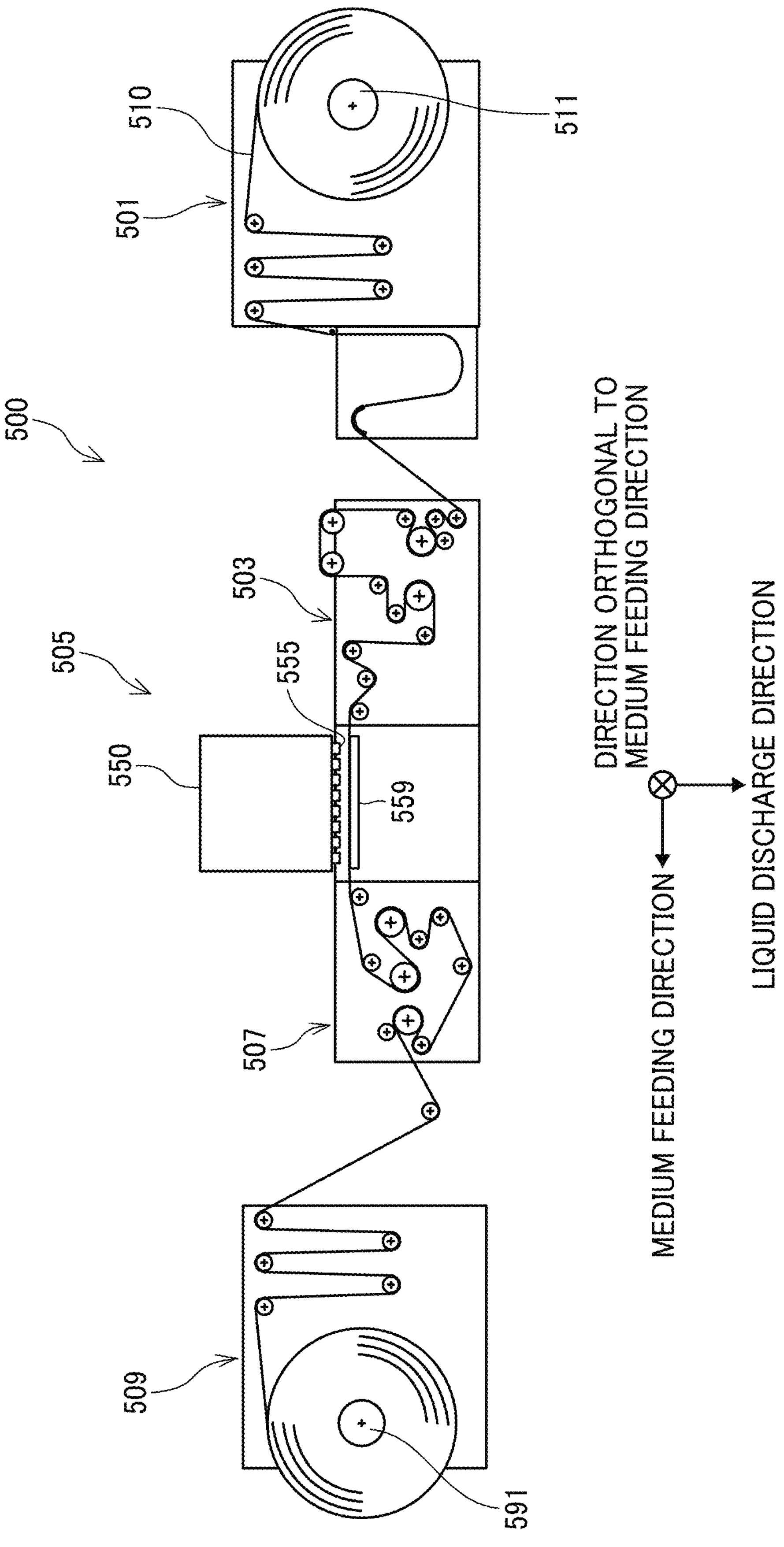
FIG. 1 is a schematic configuration diagram illustrating an example of a liquid discharge apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, embodiments for carrying out the disclosure will be described referring to the drawings. In the description of the drawings, the same elements are denoted by the same reference numerals, and redundant description is omitted.

[Outline of Liquid Discharge Apparatus]

First, an outline of a liquid discharge apparatus will be described referring to FIG. 1. FIG. 1 is a schematic configuration diagram illustrating an example of a liquid discharge apparatus. The exemplified liquid discharge apparatus is a printing apparatus that discharges ink onto a sheet by an inkjet scheme to form an image on the sheet.

A printing apparatus 500 includes a sheet-feeding unit 501, a conveying unit 503, a printing unit 505, a drying unit 507, and a sheet-ejecting unit 509. The sheet-feeding unit 501 includes a holding roller 511 that holds a sheet 510 wound in a roll shape, and supplies the long continuous sheet 510 to the printing unit 505 side. The conveying unit 503 performs, for example, tension control or meandering correction on the sheet 510 supplied from the sheet-feeding unit 501 to adjust the state of the tension and the conveyance position of the sheet 510, and conveys the sheet 510 to the printing unit 505.

The printing unit 505 includes an inkjet recording unit 550 including head units 555, and a conveyance guide member 559 facing the inkjet recording unit 550. The printing unit 505 discharges ink from the head units 555 onto the sheet 510 moving on the conveyance guide member 559 to form an image on the sheet 510.

The number of the head units 555 included in the inkjet recording unit 550 may be appropriately increased or decreased according to the types and number of colors of inks used in the printing apparatus 500. The liquid used in the head units 555 is not limited to the ink, and may include a treatment liquid for modifying the surface of the sheet 510, a coating agent for protecting an image formed on the sheet 510, or the like.

The drying unit 507 heats the sheet 510 on which an image is placed, and dries the sheet 510 and the image on the sheet 510. The sheet-ejecting unit 509 includes a winding roller 591 that winds the sheet 510, and winds the sheet 510 fed out from the drying unit 507.

Hereinafter, a description will be given on the basis the configuration of the printing apparatus 500 described above, but liquid discharge apparatuses according to the present embodiment are not limited to the printing apparatus. For example, a liquid discharge apparatus according to the present embodiment may be applied to a solid-modeling apparatus (three-dimensional-modeling apparatus) that discharges a modeling liquid to powder layers in which powder has been formed in layers to model a solid model (three-dimensional model). A liquid discharge apparatus according to the present embodiment may be applied to an electronic-element-producing apparatus that discharges a resist-pattern-forming liquid to form a resist pattern of an electronic circuit.

The medium is not limited to the sheet 510. In addition to paper, a liquid discharge apparatus according to the present embodiment may be applied to various materials, such as fiber, fabric, leather, metal, plastic, glass, wood, and ceramics. The form of the medium is not limited to a long object, and may be a medium cut into a predetermined size.

Exemplified as the printing apparatus 500 is what is called a line-type apparatus configuration in which the sheet 510 is moved relative to the inkjet recording unit 550 at a fixed position, and an image is formed on the sheet 510. However, the printing apparatus 500 is not limited to the line type. It is sufficient if the inkjet recording unit 550 and the sheet 510 move relative to each other. Therefore, for example, what is called a serial-type apparatus configuration in which an inkjet recording unit is moved relative to an intermittently fed sheet, in a direction orthogonal to a sheet feeding direction, to form an image on the sheet 510 may be. Alternatively, what is called a flatbed-type apparatus configuration in which an inkjet recording unit is moved relative to a sheet held on a sheet placement table, in XY directions, to form an image on the sheet 510 may be.

As discharge objects used in the liquid discharge apparatus, exemplified are solutions, suspensions, emulsions, and the like including solvents, such as water and organic solvents, colorants, such as dyes and pigments, function-imparting materials, such as polymerizable compounds, resins, and surfactants, biocompatible materials, such as deoxyribonucleic acid (DNA), amino acids, proteins, and calcium, edible materials, such as natural pigments, or the like. The liquid may contain fine powder, such as metal powder. These are used for, for example, applications, such as inkjet ink, coating material, surface treatment liquid, constituent elements of electronic elements and light-emitting elements, liquid for forming electronic-circuit resist patterns, and material liquid for three-dimensional modeling.

[Configuration of Head Unit]

Figure 2:
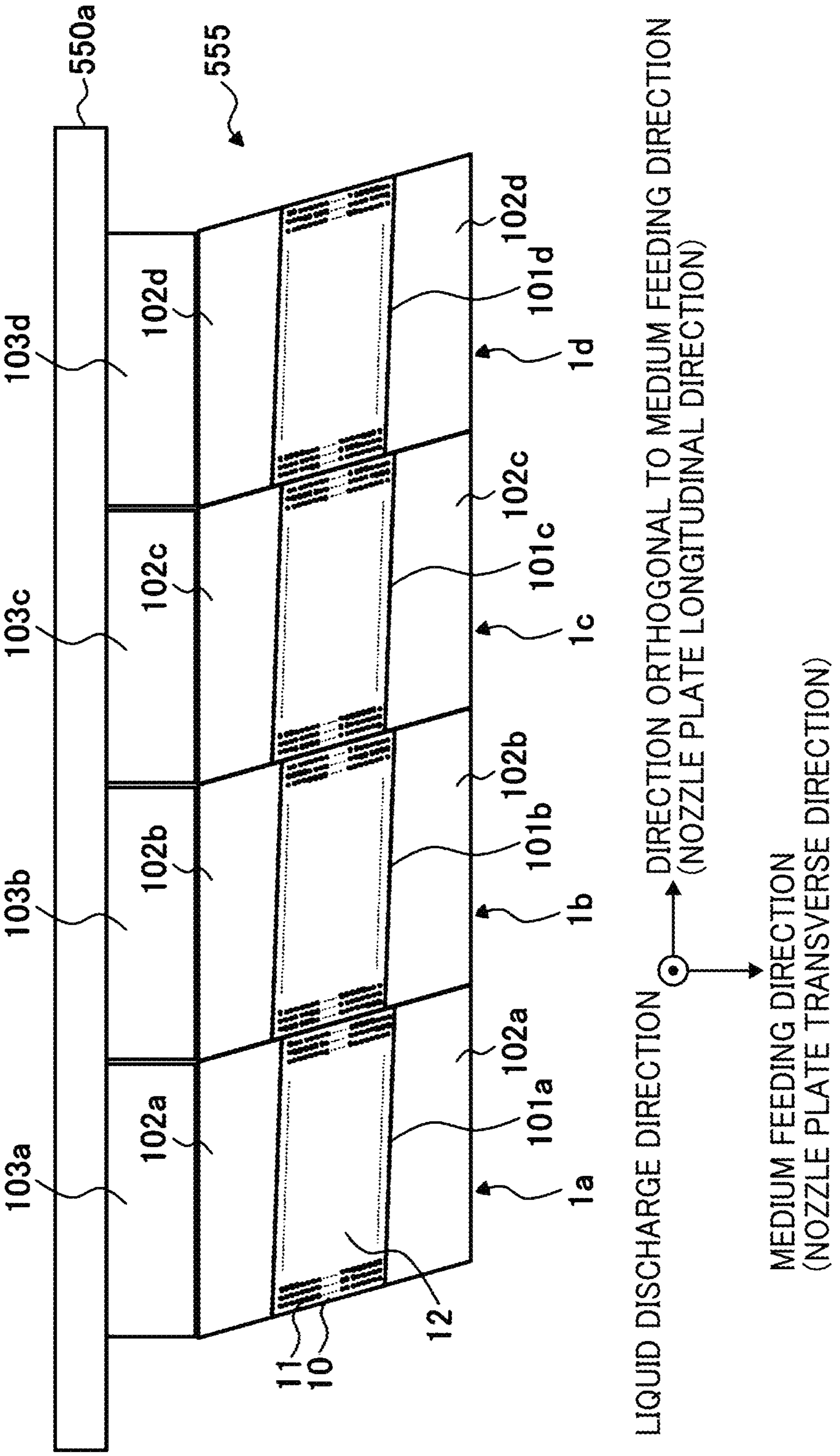
FIG. 2 is an explanatory diagram illustrating an example of a head unit.

Next, a configuration of a head unit will be described referring to FIG. 2. FIG. 2 is an explanatory diagram illustrating an example of a head unit, and is a diagram in which one of the eight head units 555 illustrated in the inkjet recording unit 550 of FIG. 1 is seen from the conveyance guide member 559 side.

The head unit 555 includes multiple heads 1_a_, 1_b_, 1_c_, and 1_d_ aligning adjacent to each other in a direction orthogonal to a medium feeding direction. Hereinafter, these heads 1_a_ to 1_d_ will be collectively referred to as the "heads 1". In the present embodiment, the "direction orthogonal to the medium feeding direction" approximately coincides with a "second direction" (a direction in which multiple nozzles aligns at regular intervals at a predetermined pitch corresponding to the recording resolution) to be described later. The "medium feeding direction" approximately coincides with a "first direction" (a direction orthogonal to the second direction) to be described later.

The heads 1_a_ to 1_d_ include liquid dischargers 101_a_ to 101_d_, nozzle plate holders 102_a_ to 102_d_, and mounts 103_a_ to 103_d_. Hereinafter, the liquid dischargers 101_a_ to 101_d_ will be collectively referred to as the "liquid dischargers 101", the nozzle plate holders 102_a_ to 102_d_ will be collectively referred to as the "nozzle plate holders 102", and the mounts 103_a_ to 103_d_ will be collectively referred to as the "mounts 103".

The liquid discharger 101 of the head 1 includes a nozzle plate 10 having a substantially parallelogram outer shape. The nozzle plate 10 has a nozzle surface 12 in which nozzles 11 for discharging liquid are formed. Although illustration of some of the nozzles 11 is omitted in FIG. 2, the nozzles 11 are actually formed in a blank portion of the nozzle surface (nozzle region 12). The nozzle plate 10 is held by the nozzle plate holder 102. The nozzle plate holder 102 includes the mount 103 in part of the nozzle plate holder 102. The mounts 103 are attached to a support 550_a_ provided for the inkjet recording unit 550, so that the head unit 555 is secured to the inkjet recording unit 550. In the following description, the "nozzle surface" is also referred to as a "nozzle region 12". The head 1 is an example of a "liquid discharge head".

[Configuration of Head]

Figure 3:
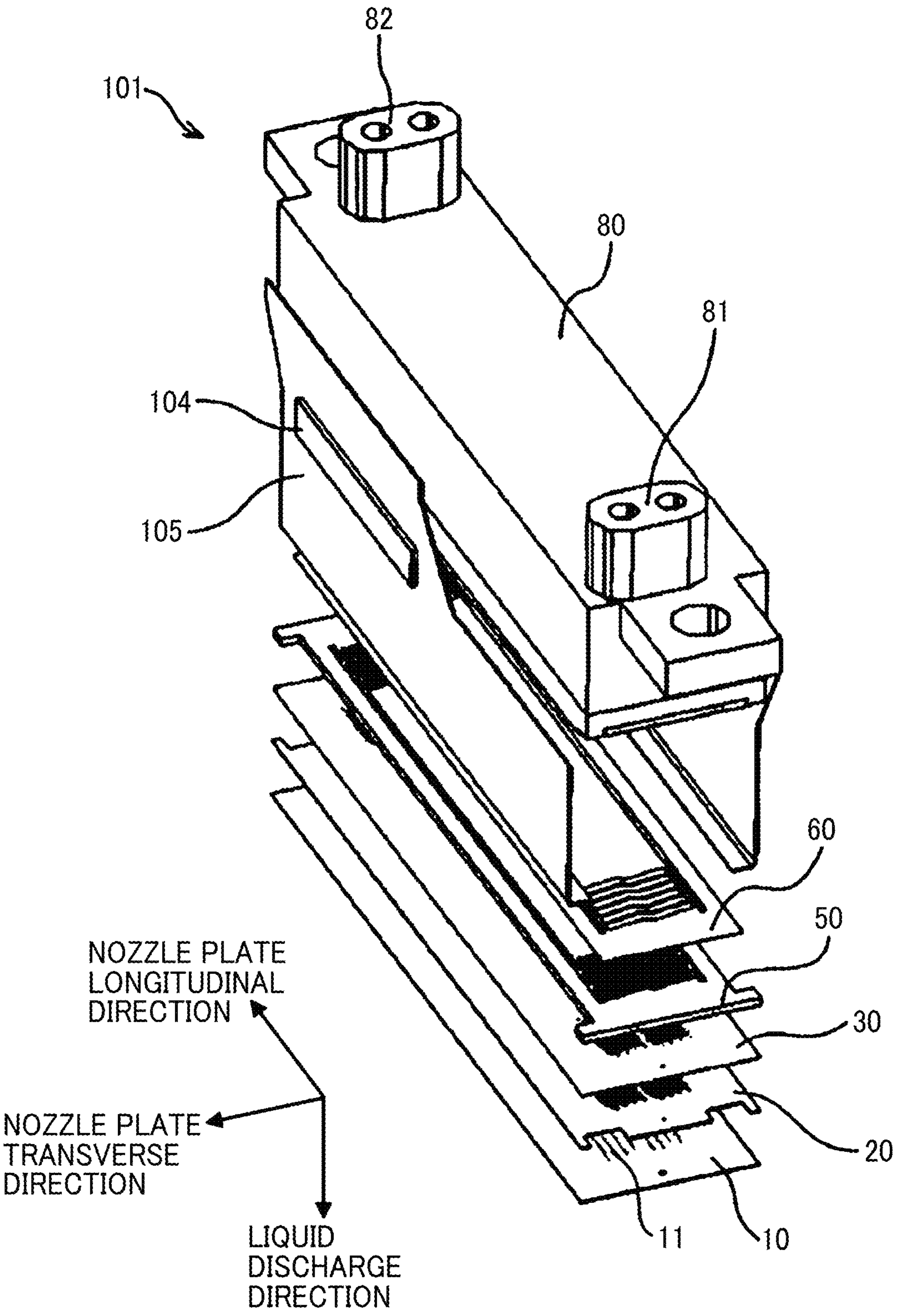
FIG. 3 is a schematic exploded view illustrating an example of a head.
Figure 4:
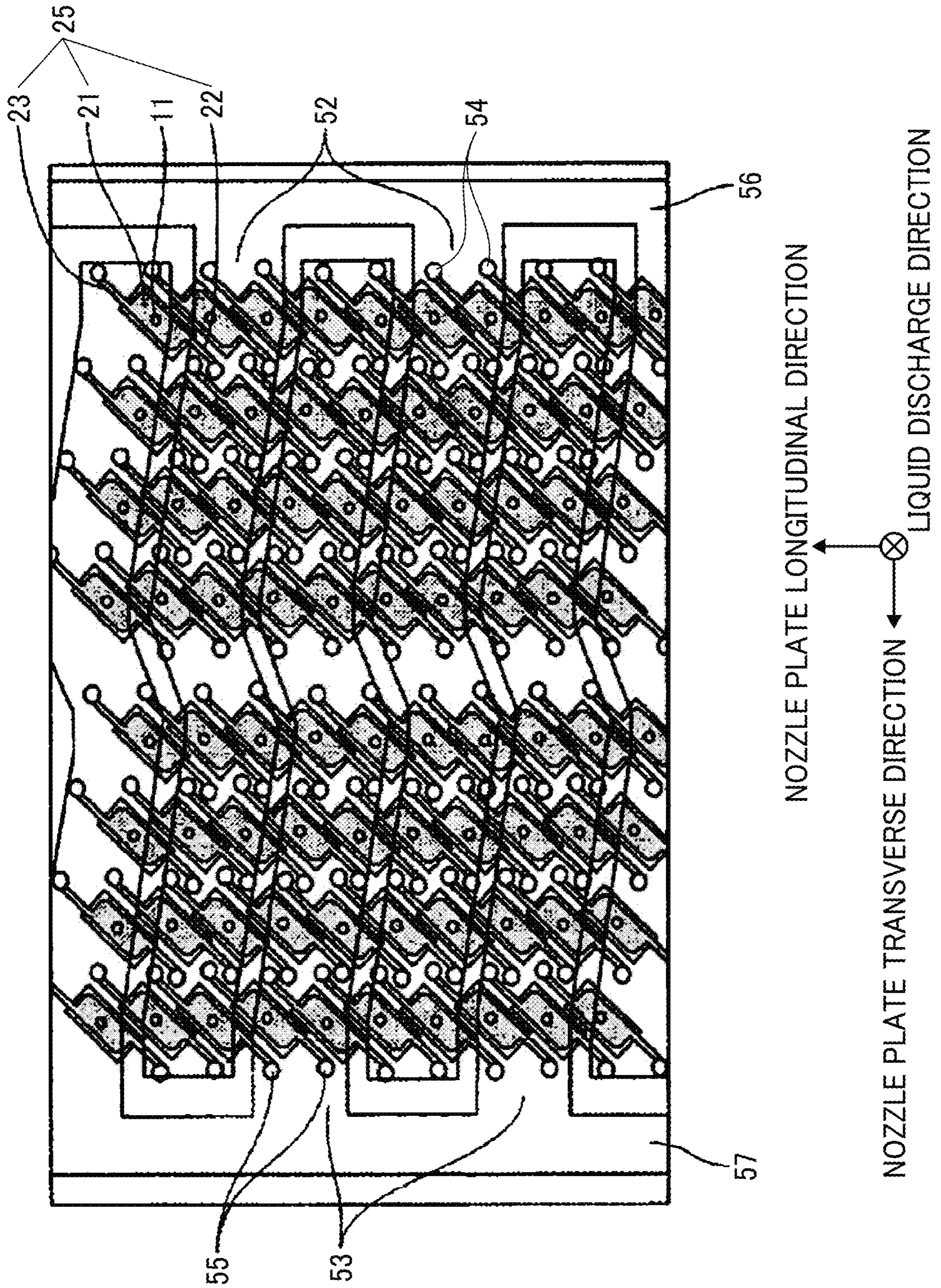
FIG. 4 is an explanatory diagram illustrating an example of a channel portion of the head.
Figure 5:
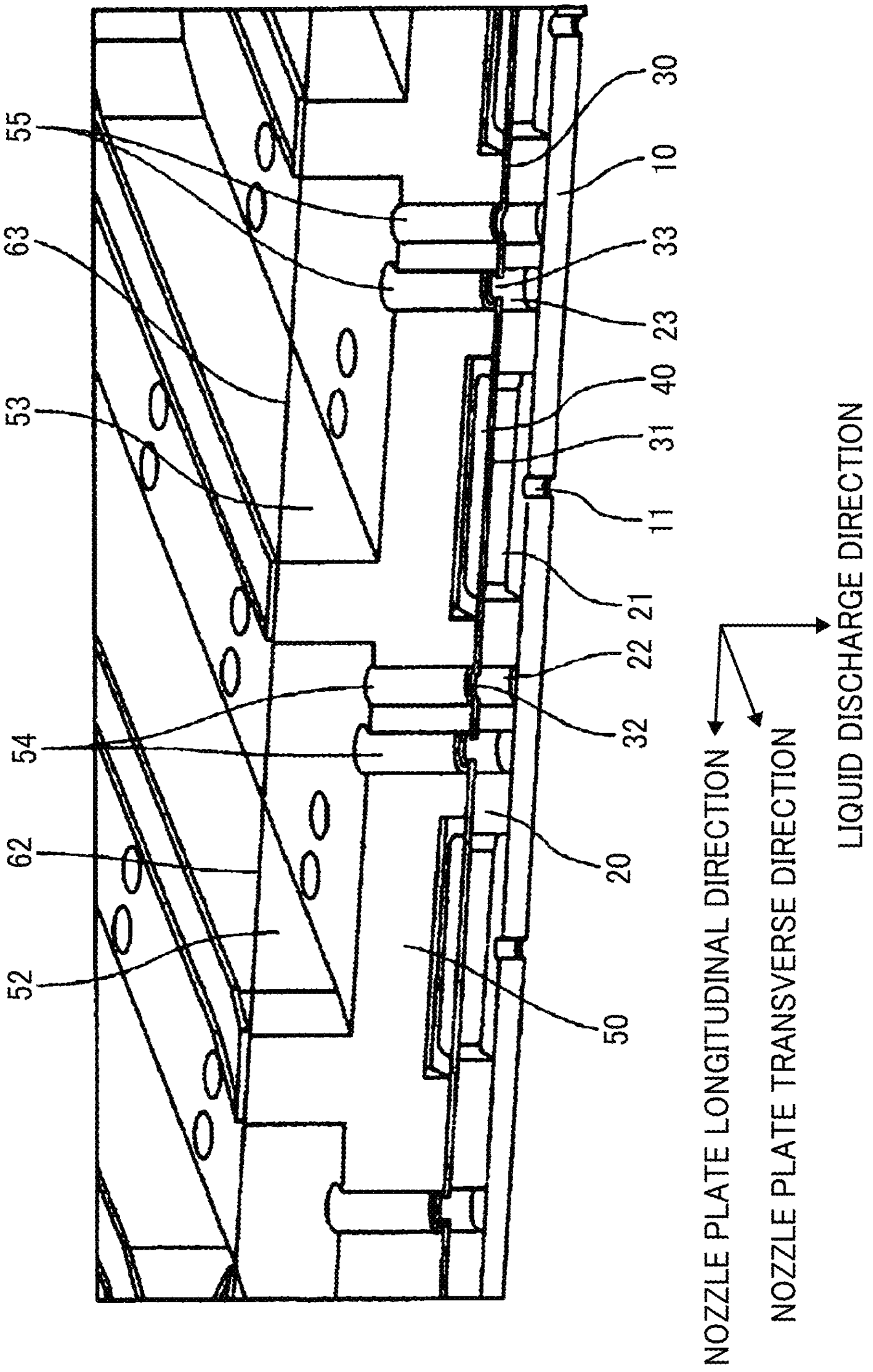
FIG. 5 is a cross-sectional perspective view illustrating an example of a channel portion of the head.

Next, the configuration of the head will be described referring to FIGS. 3 to 5. FIG. 3 is a schematic exploded view illustrating an example of the head, and is a view illustrating only the liquid discharger 101 constituting the head 1 of FIG. 2. FIG. 4 is an explanatory diagram illustrating an example of a channel portion of the head. FIG. 5 is a cross-sectional perspective view illustrating an example of a channel portion of the head. The nozzle plate 10 has a substantially parallelogram outer shape as illustrated in FIG. 2, but will be described here referring to the diagram in which the outer shape is simplified as a rectangle.

The liquid discharger 101 of the head 1 includes the nozzle plate 10, a channel plate (individual-channel member 20), a diaphragm member 30, a common-channel member 50, a damper member 60, a frame member 80, and a board (flexible wiring board) 105, on which a driving circuit 104 is mounted.

The nozzle plate 10 includes the multiple nozzles 11 that discharges liquid (ink in the present embodiment). The multiple nozzles 11 is two-dimensionally arranged in a transverse direction of the nozzle plate 10 (nozzle plate transverse direction) and a nozzle plate longitudinal direction orthogonal to the transverse direction.

The individual-channel member 20 (channel plate) includes multiple pressure chambers 21 (individual chambers) communicating with the multiple nozzles 11, respectively, multiple individual supply channels 22 communicating with the multiple pressure chambers 21, respectively, and multiple individual collection channels 23 communicating with the multiple pressure chambers 21, respectively. Each pressure chamber 21, and the individual supply channel 22 and the individual collection channel 23 that communicate with the pressure chamber 21 are collectively referred to as an individual channel 25.

The diaphragm member 30 forms a diaphragm 31, which is a deformable wall surface of the pressure chambers 21. The diaphragm 31 is integrally provided with piezoelectric elements 40. Further, the diaphragm member 30 includes supply-side openings 32 that communicate with the individual supply channels 22, and collection-side openings 33 that communicate with the individual collection channels 23.

The piezoelectric element 40 is a pressure generator to deform the diaphragm 31 to pressurize the liquid in the pressure chamber 21.

The individual-channel member 20 and the diaphragm member 30 are not limited to being separate members. For example, the individual-channel member 20 and the diaphragm member 30 may be integrally formed of the same member using a silicon on insulator (SOI) substrate. That is, an SOI substrate, in which a silicon oxide film, a silicon layer, and a silicon oxide film are formed in this order on a silicon substrate, may be used, and the silicon substrate may be the individual-channel member 20, and the silicon oxide film, the silicon layer, and the silicon oxide film may form the diaphragm 31. In this configuration, the layer configuration of the silicon oxide film, the silicon layer, and the silicon oxide film of the SOI substrate forms the diaphragm member 30. Thus, the diaphragm member 30 may be formed by materials formed as films on a surface of the individual-channel member 20.

The common-channel member 50 includes multiple common-supply branch channels 52 communicating with two or more of the individual supply channels 22, and multiple common-collection branch channels 53 communicating with two or more of the individual collection channels 23. The multiple common-supply branch channels 52 and the multiple common-collection branch channels 53 are formed alternately in the nozzle plate longitudinal direction and are adjacent to each other. The common-channel member 50 includes through holes serving as supply ports 54 that connect the supply-side openings 32 of the individual supply channels 22 and the common-supply branch channels 52, and through holes serving as collection ports 55 that connect the collection-side openings 33 of the individual collection channels 23 and the common-collection branch channels 53. The common-channel member 50 also includes one or multiple common-supply main channels 56 communicating with the multiple common-supply branch channels 52, and one or multiple common-collection main-flow channels 57 communicating with the multiple common-collection branch channels 53.

The damper member 60 includes supply-side dampers 62 that are opposite (face) the supply ports 54 of the common-supply branch channels 52, and collection-side dampers 63 that are opposite (face) the collection ports 55 of the common-collection branch channels 53. The common-supply branch channels 52 and the common-collection branch channels 53 are configured by sealing, with the supply-side dampers 62 and the collection-side dampers 63 of the damper member 60, grooves alternately disposed in the common-channel member 50, which is the same member. As a damper material of the damper member 60, a metal thin film or an inorganic thin film resistant to an organic solvent is preferably used. A thickness of the supply-side dampers 62 and the collection-side dampers 63 of the damper member 60 is preferably 10 μm or less.

On inner wall surfaces of the common-supply branch channels 52 and the common-collection branch channels 53, and on inner wall surfaces of the common-supply main channels 56 and the common-collection main-flow channels 57, a protective film (also referred to as a wetted film) for protecting the inner wall surfaces against liquid flowing in the channels is formed. For example, heat treatment is performed on a silicon (Si) substrate, so that a silicon oxide film is formed on the inner wall surfaces of the common-supply branch channels 52 and the common-collection branch channels 53 and on the inner wall surfaces of the common-supply main channels 56 and the common-collection main-flow channels 57. A tantalum silicon oxide film to protect a surface of the Si substrate from the ink is formed on the silicon oxide film.

The frame member 80 includes a supply port 81 and a release port 82 on an upper portion of the frame member 80. The supply port 81 supplies liquid to the common-supply main channels 56, and the release port 82 releases liquid released from the common-collection main-flow channels 57.

[Definition of Nozzle Row]

Before the array of the nozzles 11 provided for the nozzle plate 10 is described, the definition and the like of nozzle rows in the present embodiment will be described referring to FIGS. 6 and 7.

Figure 6:
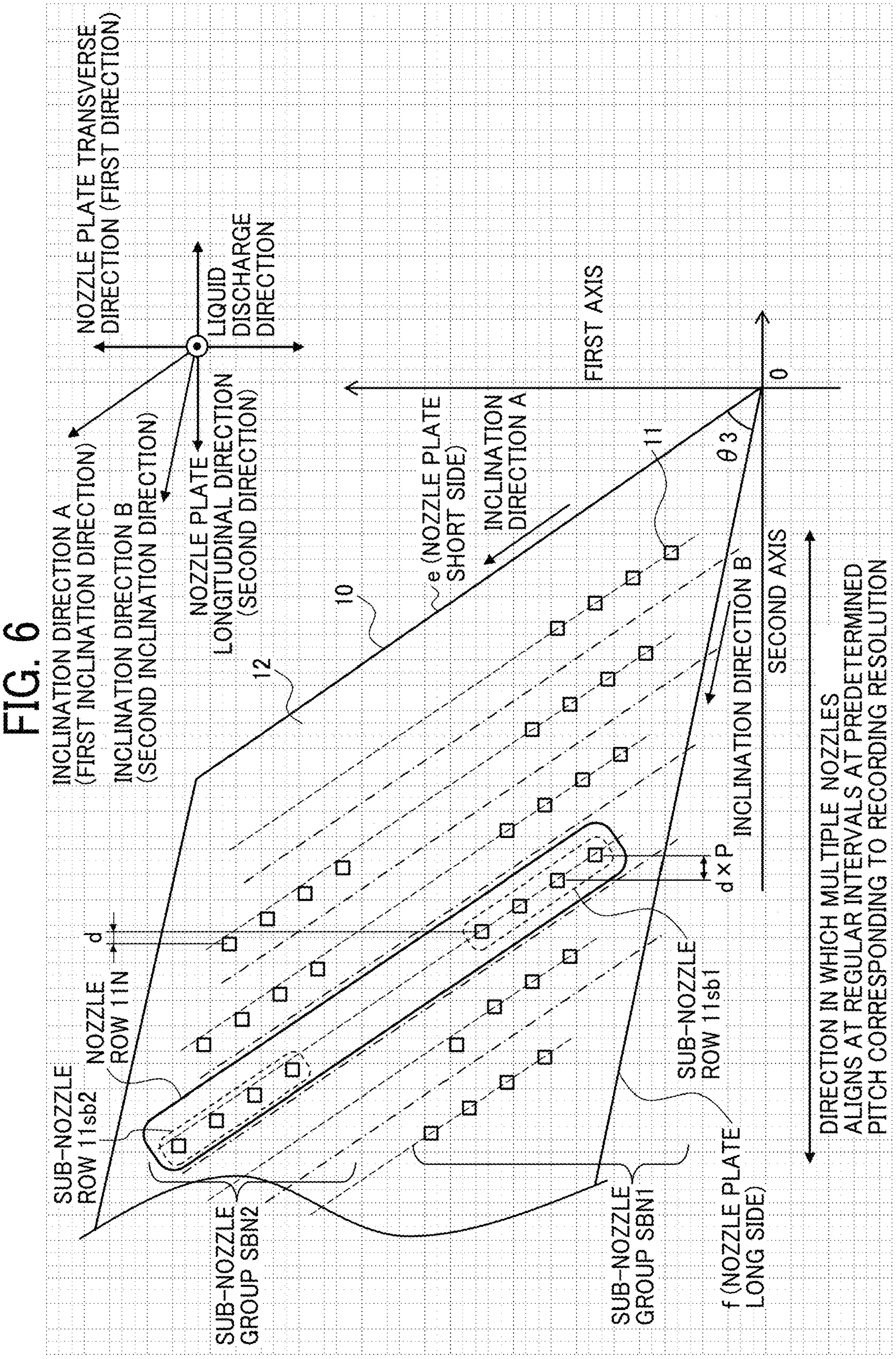
FIG. 6 is an explanatory diagram of the definition of nozzle rows.

In FIG. 6, the nozzle plate 10 includes the multiple nozzles 11 arranged on a plane formed by a first axis and a second axis orthogonal to the first axis.

The “first axis” is an axis extending parallel to a “first direction,” as illustrated in FIG. 6. In the present embodiment, the “first axis” and the “first direction” are also the “nozzle plate transverse direction.”

The “second axis” is an axis extending parallel to a “second direction,” as illustrated in FIG. 6. In the present embodiment, the “second axis” and the “second direction” are also the “nozzle plate longitudinal direction.” The “second axis” and the “second direction” are also a “direction in which the multiple nozzles aligns at regular intervals at a predetermined pitch corresponding to the recording resolution."

The "nozzle plate transverse direction" does not refer to a direction of a short side of the nozzle plate 10 having a parallelogram outer shape, but is a direction of a short side of a rectangle in a case where the nozzle plate is assumed to be a rectangle and long sides of the rectangle are horizontally placed. Similarly, the "nozzle plate longitudinal direction" does not refer to a direction of a long side of the nozzle plate 10 having a parallelogram outer shape, but is a direction of a long side of a rectangle in a case where the nozzle plate is assumed to be a rectangle.

The nozzle plate 10 has a parallelogram outer shape formed by nozzle plate short sides e inclined in an inclination direction A relative to the first axis (first direction), and nozzle plate long sides f inclined in an inclination direction B relative to the second axis (second direction).

The multiple nozzles 11 provided for the nozzle plate 10 is divided into multiple nozzles constituting a sub-nozzle group SBN1 and multiple nozzles constituting a sub-nozzle group SBN2. Hereinafter, in order to distinguish between a case where all the nozzles existing in the nozzle plate 10 are referred to, and a case where nozzles belonging to each of the sub-nozzle groups SBN1 and SBN2 are referred to, the nozzles belonging to each of the sub-nozzle groups SBN1 and SBN2 are referred to as "sub-nozzles".

The multiple sub-nozzles 11 constituting the sub-nozzle group SBN1 is disposed at d×P intervals in the nozzle plate longitudinal direction. "d" is the recording resolution, and P is the number of sub-nozzle groups (an integer of one or more). That is, since the two sub-nozzle groups SBN1 and SBN2 are provided for the nozzle plate 10, FIG. 6 illustrates an example of a case where P=2. The multiple (four in FIG. 6) sub-nozzles 11 aligning at d×P intervals is disposed in the inclination direction A inclined relative to the nozzle plate transverse direction and the nozzle plate longitudinal direction, so that the multiple sub-nozzles 11 forms one sub-nozzle row 11*sb*1. The inclination direction A is an example of a "first inclination direction." In the present embodiment, the inclination direction A is parallel to the above-described nozzle plate short side e.

Similarly to the sub-nozzle group SBN1, the multiple sub-nozzles 11 constituting the sub-nozzle group SBN2 is also disposed at d×P intervals in the nozzle plate longitudinal direction. The multiple sub-nozzles 11 aligning at d×P intervals is disposed in the inclination direction A inclined relative to the nozzle plate transverse direction and the nozzle plate longitudinal direction, so that the multiple sub-nozzles 11 forms one sub-nozzle row 11*sb*2.

In the above configuration, a set of rows including the two sub-nozzle rows 11*sb*1 and 11*sb*2 aligning along the inclination direction A is defined as a "nozzle row" (nozzle row 11N). Multiple the nozzle rows 11N is arranged along the inclination direction B that is different from the inclination direction A, and is inclined relative to the nozzle plate longitudinal direction and the nozzle plate transverse direction. In this case, the nozzle rows 11N are arranged at N×d intervals in the nozzle plate longitudinal direction. N is the number (an integer of one or more) of nozzles included in the nozzle row 11N. The "d" is the recording resolution. The inclination direction B is an example of a "second inclination direction." In the present embodiment, the inclination direction B is parallel to the above-described nozzle plate long side f.

The number of the nozzles 11 constituting the sub-nozzle rows 11*sb*1 and 11*sb*2 is not limited to four. The number of the nozzles may be larger or smaller than four. The number of the sub-nozzle groups SBN1 and SBN2 is not limited to two. The number of the sub-nozzle groups SBN1 and SBN2 may be larger than two, or may be one.

Figure 7:
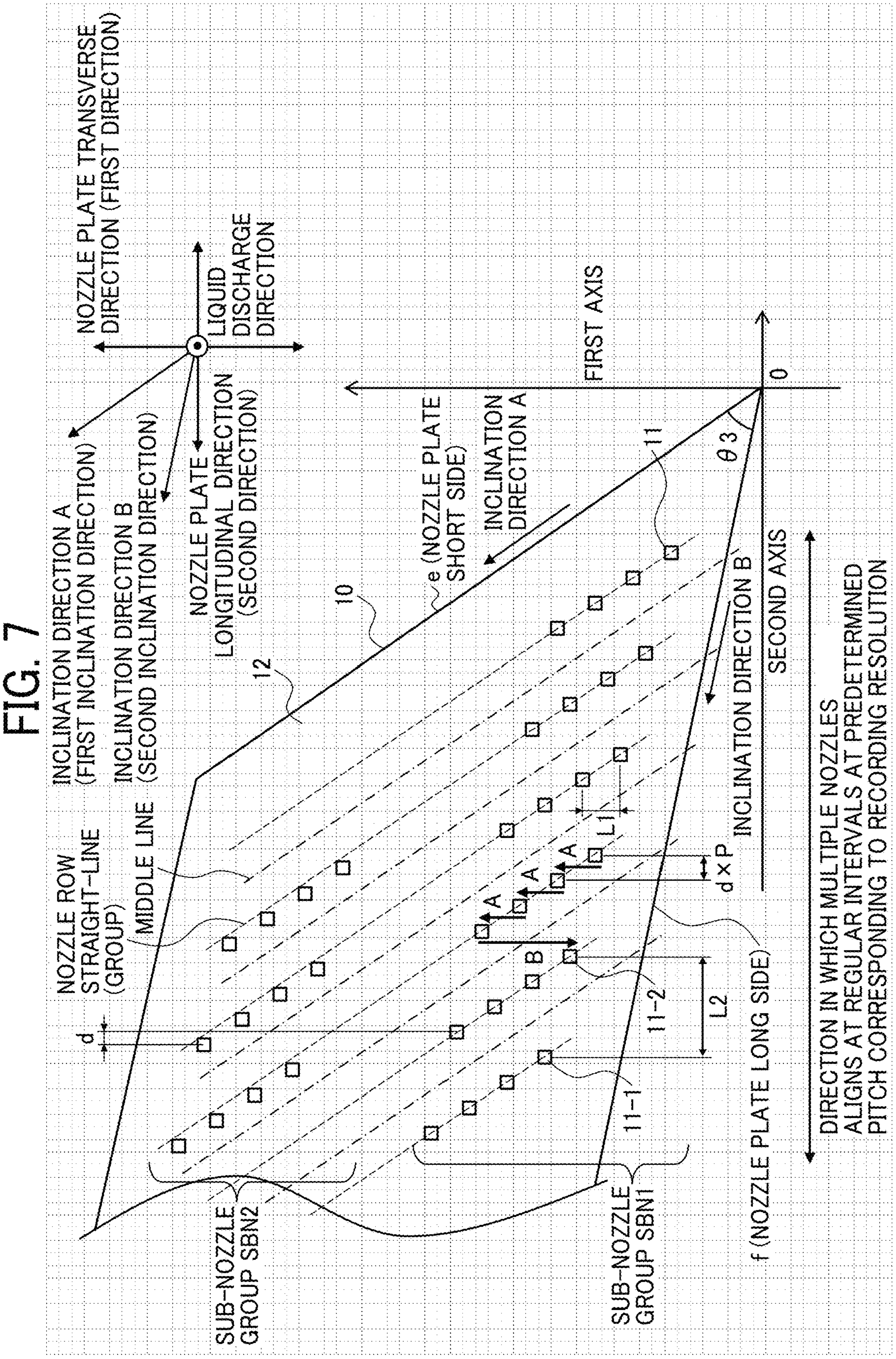
FIG. 7 is an explanatory diagram of the definition of the nozzle rows.

FIG. 7 is an explanatory diagram for more specifically describing the definition of the nozzle row. The multiple nozzles 11 is divided into the two sub-nozzle groups SBN1 and SBN2. The multiple nozzles 11 included in each of the sub-nozzle rows 11*sb*1 and 11*sb*2 (see FIG. 6) of the sub-nozzle groups SBN1 and SBN2 is arranged at d P intervals in the nozzle plate longitudinal direction.

For the multiple nozzles 11 aligning in the nozzle plate longitudinal direction, the arrangement in the nozzle plate transverse direction is such that a predetermined number of nozzles are arranged in such a manner that the predetermined number of nozzles are shifted by a predetermined distance L1 in the first direction (the direction of arrows A illustrated in the nozzle surface 12). A nozzle of the next sub-nozzle row is shifted in a second direction (direction of an arrow B illustrated in the nozzle surface 12) opposite to the first direction. The nozzles 11 are regularly arranged by repeating the above.

A point at which the nozzle plate short side e and the nozzle plate long side f intersect at an angle θ3 (θ3 is an acute angle) is an origin 0. A coordinate plane is formed such that the nozzle plate short side e extends from the origin 0 to the second quadrant. Of two axes forming the coordinate plane and orthogonal to each other, an axis extending in the nozzle plate transverse direction is defined as the "first axis," and an axis extending in the nozzle plate longitudinal direction is defined as the "second axis."

A row including multiple nozzles including one nozzle of sub-nozzles included in a sub-nozzle group closest to the origin 0 in the nozzle plate transverse direction (the sub-nozzle group SBN1 in the present example), and one or multiple nozzles arranged at regular d×P intervals on the second-axis negative side, as viewed from the one nozzle, and at regular predetermined-distance-L1 intervals on the first-axis positive side is defined as a "first sub-nozzle row".

A space between the nozzles included in the multiple first sub-nozzle rows, respectively, in a region near the center of the nozzle plate 10, and arranged closest to the first-axis negative side is divided by a predetermined pitch (recording resolution d) to obtain a number defined as N.

A distance by which one straight line passing through multiple nozzles included in a first sub-nozzle row is shifted in such a manner that a nozzle included in the first sub-nozzle row and arranged closest to the first-axis negative side (a nozzle 11-1 in this example) is assumed to be a base point, and the base point coincides with a nozzle included in a sub-nozzle row adjacent to the first sub-nozzle row and arranged closest to the first-axis negative side (a nozzle 11-2 in this example) is defined as L2.

A straight-line group (straight lines indicated by broken lines in FIG. 7) including a straight line passing through multiple nozzles included in a first sub-nozzle row, and multiple straight lines shifted at regular distance-L2 intervals is defined as a "nozzle row straight-line group". A line passing through the middle between the straight lines included in the nozzle row straight-line group (a straight line indicated by a dashed-dotted line in FIG. 7) is defined as a "middle line".

At this time, the "nozzle row" is defined as a row including, among the multiple nozzles 11 included in the entire P sub-nozzle groups, nozzles on one straight line included in the nozzle row straight-line group, nozzles located on a middle line adjacent to the one straight line on the second-axis positive side of the one straight line in the nozzle plate longitudinal direction, or located closer to the one straight line than the middle line, and nozzles located closer to the one straight line than a middle line adjacent to the one straight line on the second-axis negative side of the one straight line.

Comparative Example

Figure 8B:
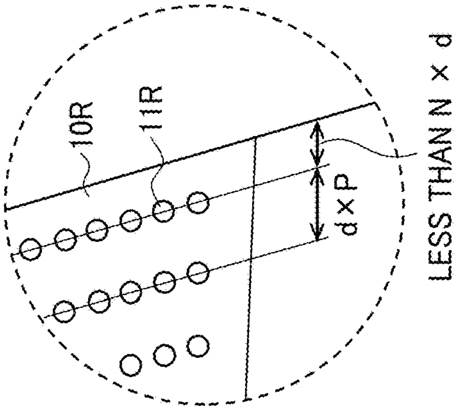
FIGS. 8A and 8B are explanatory diagrams illustrating a head of a comparative example.
Figure 8B:
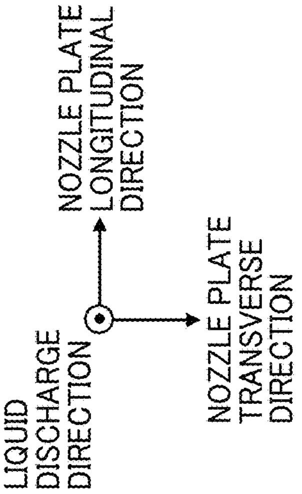
Figure 8A:
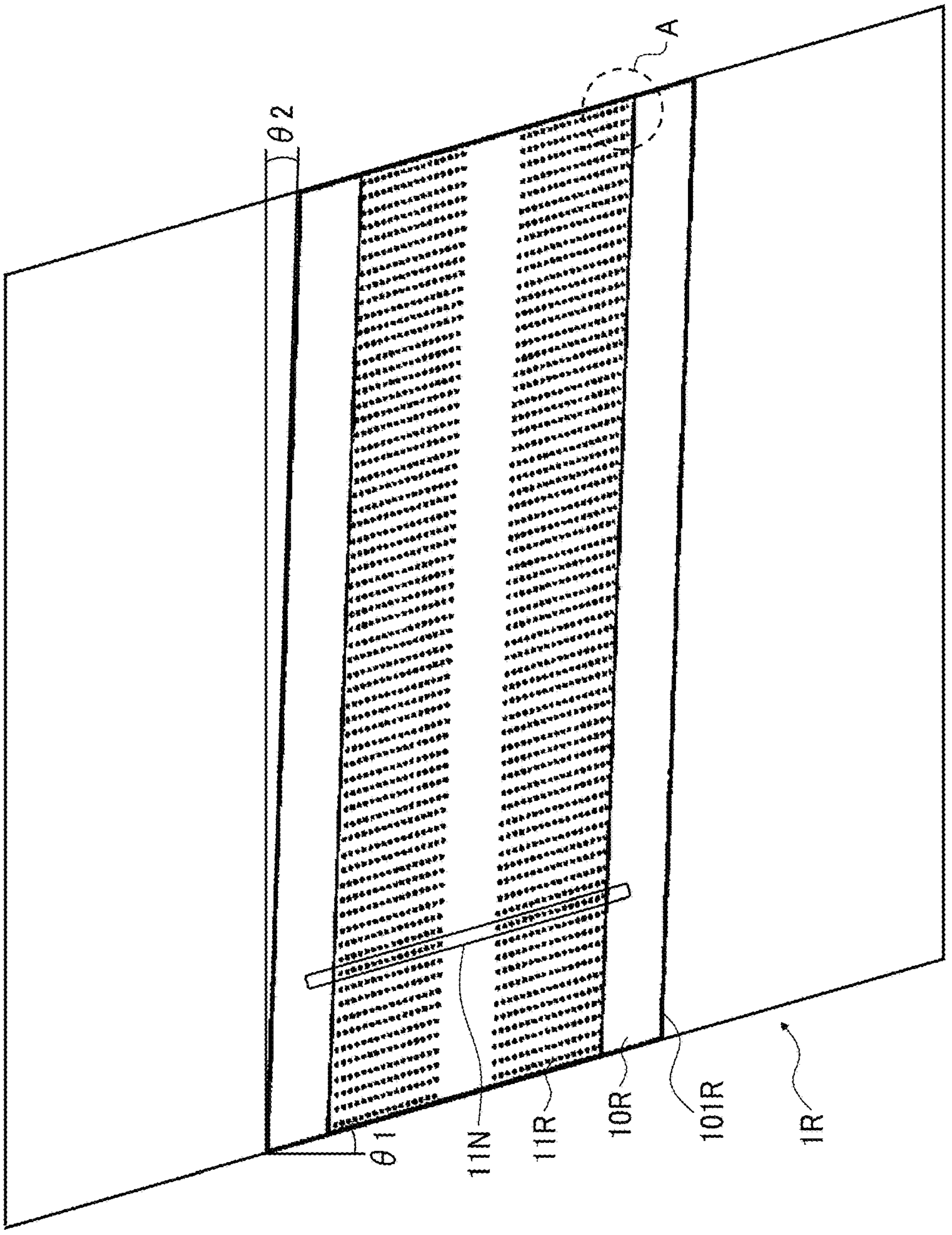
Figure 9:
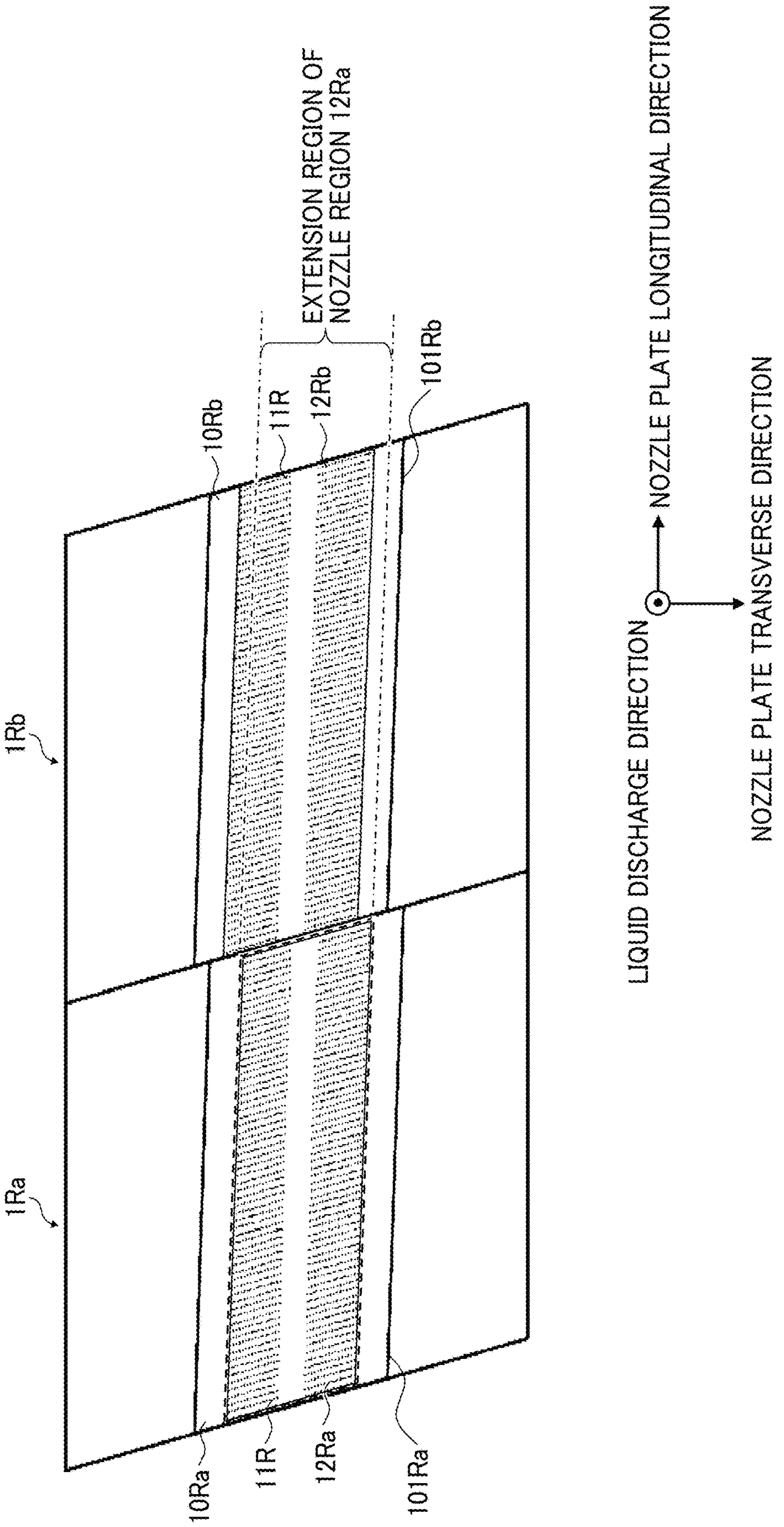
FIG. 9 is an explanatory diagram illustrating a state in which multiple the heads of the comparative example is disposed.

Next, a configuration of a comparative example will be described referring to FIGS. 8A, 8B and 9. FIGS. 8A and 8B are explanatory diagrams illustrating a head of a comparative example. FIG. 8A is a schematic configuration diagram of the head. FIG. 8B is an enlarged view of a portion A illustrated in FIG. 8A. FIG. 9 is an explanatory diagram illustrating a state in which multiple the heads of the comparative example is disposed.

In a head 1R illustrated as the comparative example, a liquid discharger 101R and a nozzle plate 10R have an outer shape (ridge line) inclined at an angle θ1 relative to a nozzle plate transverse direction and inclined at an angle θ2 relative to a nozzle plate longitudinal direction. That is, the liquid discharger 101R and the nozzle plate 10R have a parallelogram outer shape. In the nozzle plate 10R, multiple nozzles 11R is regularly and two-dimensionally arrayed. The array of the nozzles 11R is, for example, an array in which N nozzles 11R constitute a nozzle row 11N, and multiple the nozzle rows 11N is provided in parallel to the above-described ridge line and in the nozzle plate longitudinal direction orthogonal to the nozzle plate transverse direction.

In the head 1R having the above configuration, as illustrated in FIG. 9, multiple heads 1Ra and 1Rb is disposed in a row in the nozzle plate longitudinal direction. The angle of a joint portion between the heads 1Ra and 1Rb (the nozzle plates 10Ra and 10Rb) depends on the nozzle density in the nozzle plate transverse direction and the nozzle plate longitudinal direction. In addition, it is necessary to provide the nozzles 11R up to end portions of the nozzle plates 10Ra and 10Rb. Therefore, as illustrate in FIG. 8B, at the end portions of the nozzle plate 10R (10Ra and 10Rb) in the nozzle plate longitudinal direction, the nozzles 11R are arranged at a distance from edges of the nozzle plate 10R that is less than a nozzle row 11N alignment space of d×P.

As a result, the distance from the nozzle row 11N at the end portion in the nozzle plate longitudinal direction, to the ridge line (edge) of the head 1R (nozzle plate 10R) is small, and there is a problem of robustness that an impact on the ridge line from the outside is likely to damage the nozzles, and pressure chambers and channels connected to the nozzles.

In a case where the heads 1Ra and 1Rb are disposed in the nozzle plate longitudinal direction, as illustrated in FIG. 9, in the configuration of the comparative example, 90% or more of a nozzle region 12Ra of the head 1Ra and 90% or more of a nozzle region 12Rb of the head 1Rb overlap. This nozzle region refers to a region surrounded by a broken line in the nozzle plate 10Ra of the head 1Ra, and means a region where the nozzles 11R of the nozzle plate 10 (10Ra and 10Rb) are formed. A range indicated by a dashed-dotted line in the nozzle plate 10Rb of the head 1Rb indicates an extension region to which the adjacent nozzle region 12Ra is extended in the nozzle plate longitudinal direction.

That is, in the configuration of the comparative example, 90% or more of the extension region of the nozzle region 12Ra and 90% or more of the nozzle region 12Rb overlap. In this case, since the numbers of nozzles, pressure chambers, channels, and the like adjacent to each other at a joint portion between the heads 1Ra and 1Rb increase, there is also a problem that damage due to an impact from the outside is likely to spread accordingly.

First Embodiment

Figures 10A, 10B:
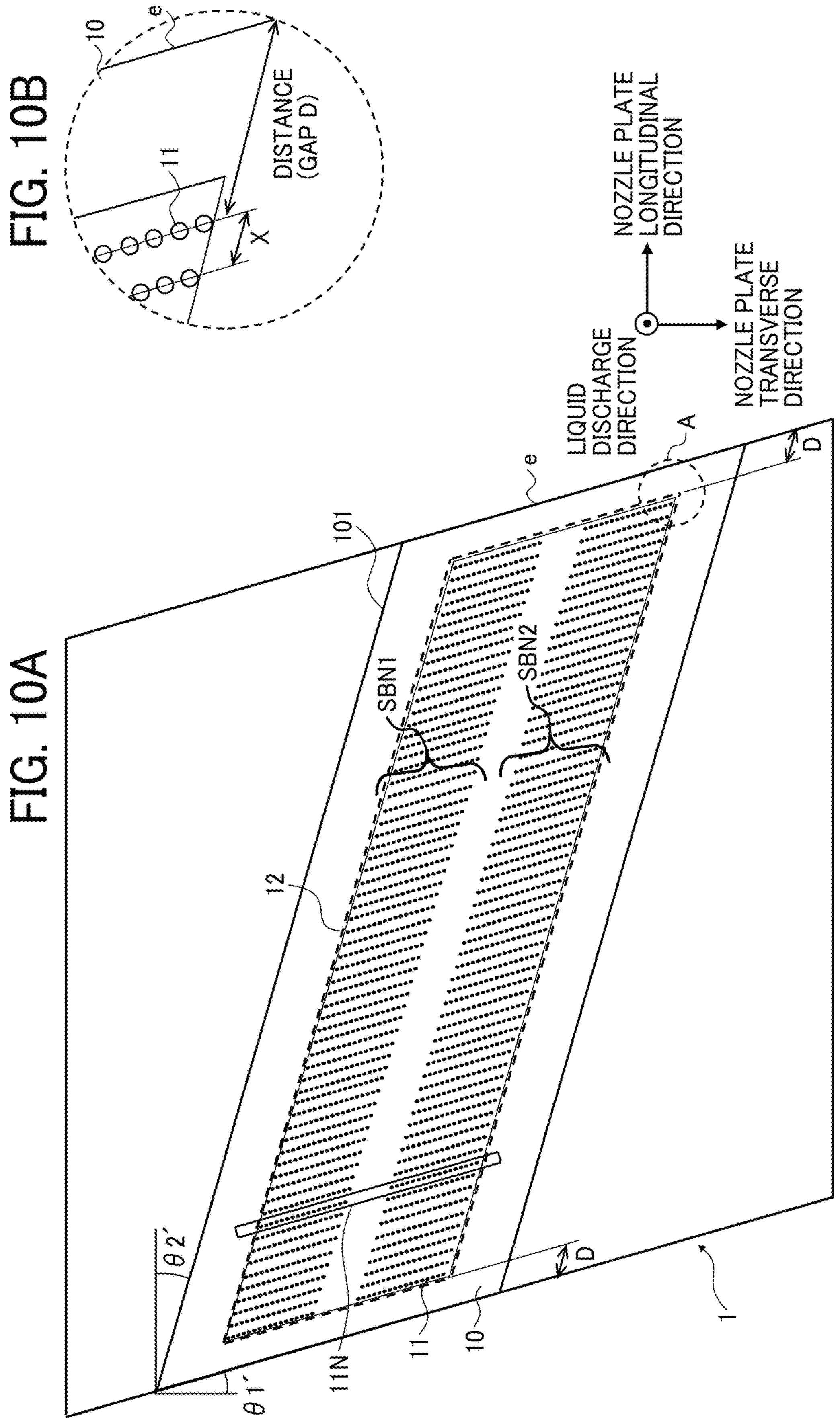
FIGS. 10A and 10B are explanatory diagrams of a head according to a first embodiment.
Figure 11:
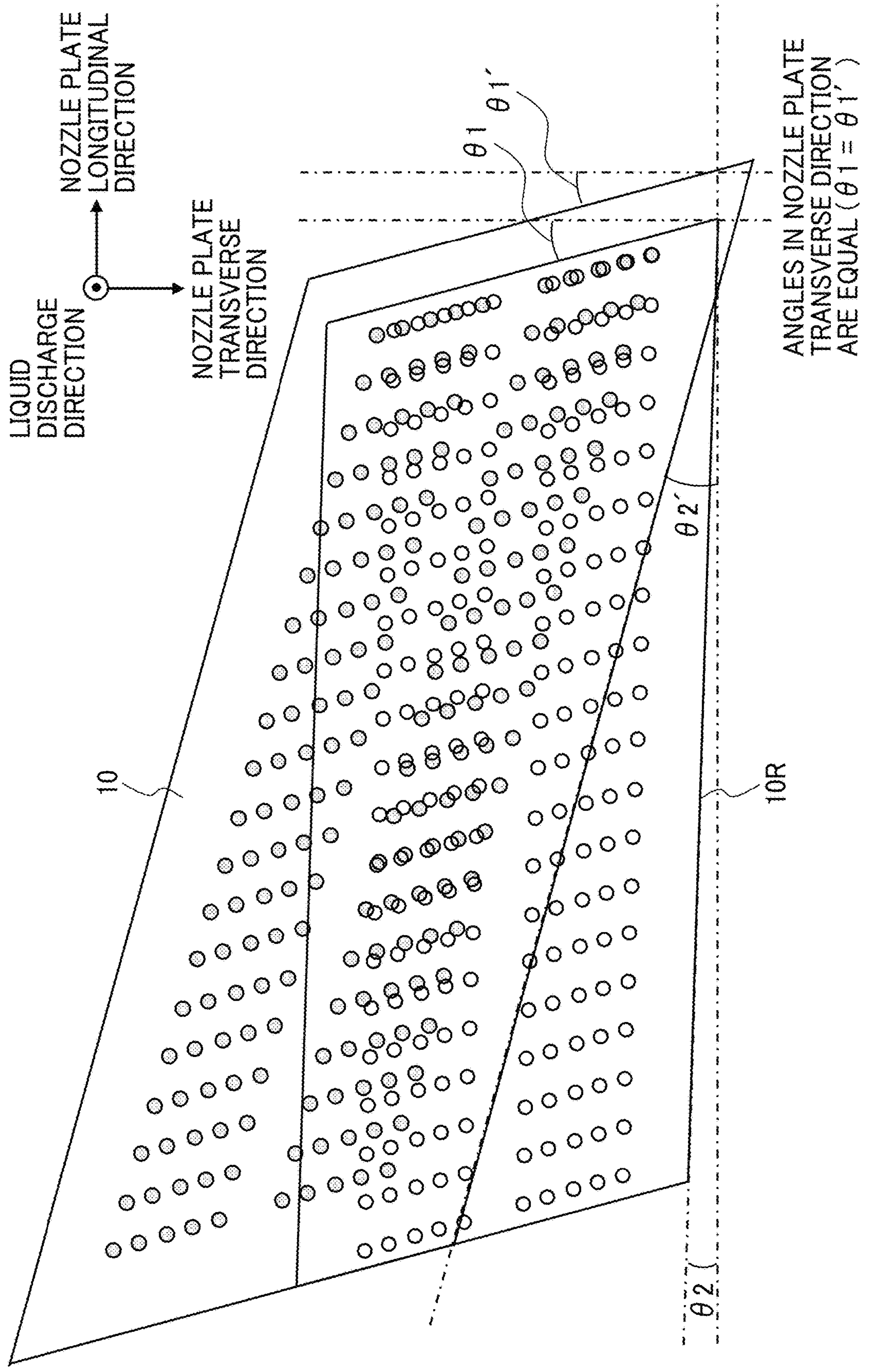
FIG. 11 is an explanatory diagram supplementing the relationship between the first embodiment and the comparative example.
Figure 12:
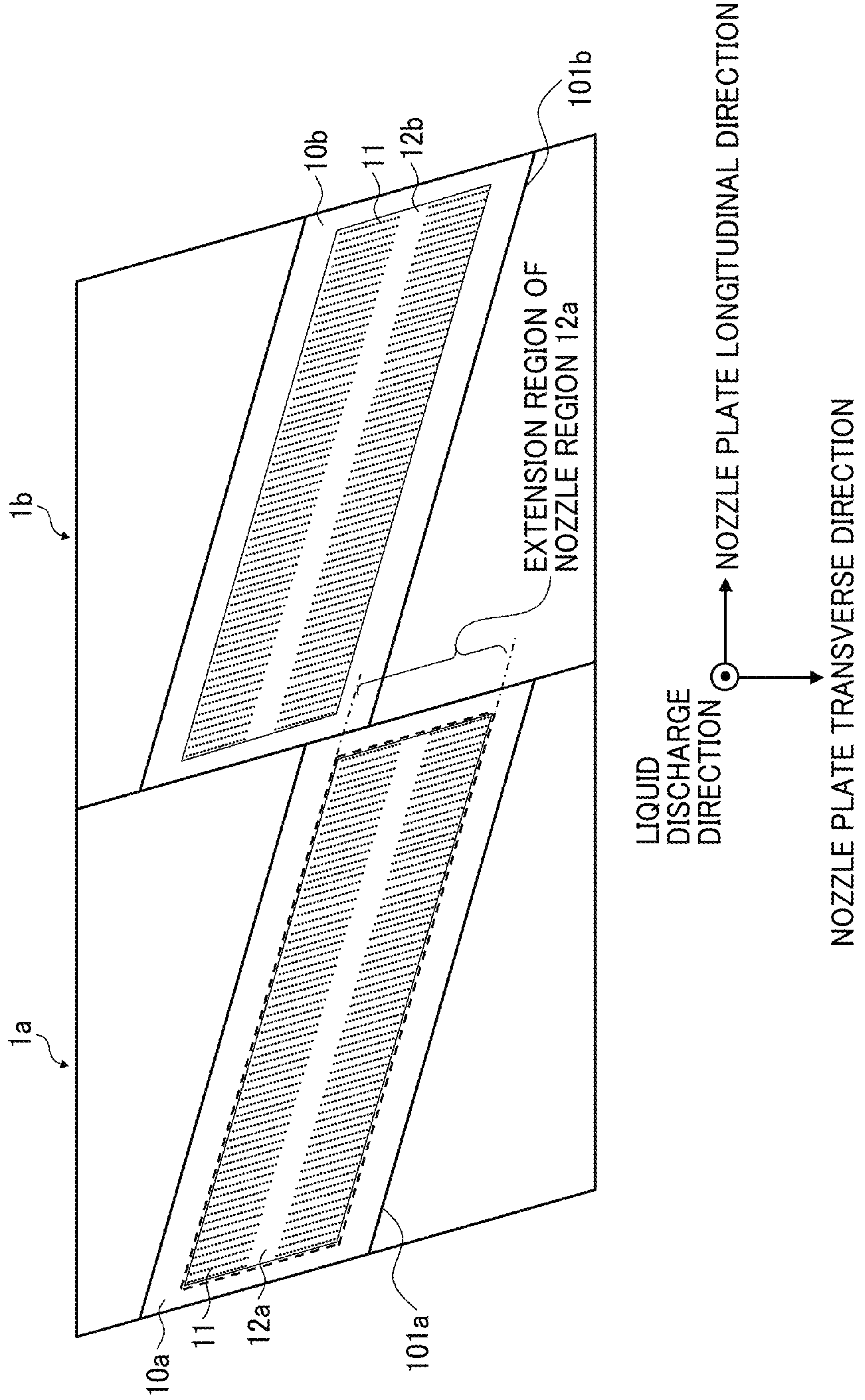
FIG. 12 is an explanatory diagram illustrating a state in which multiple the heads according to the first embodiment is disposed.
Figure 13:
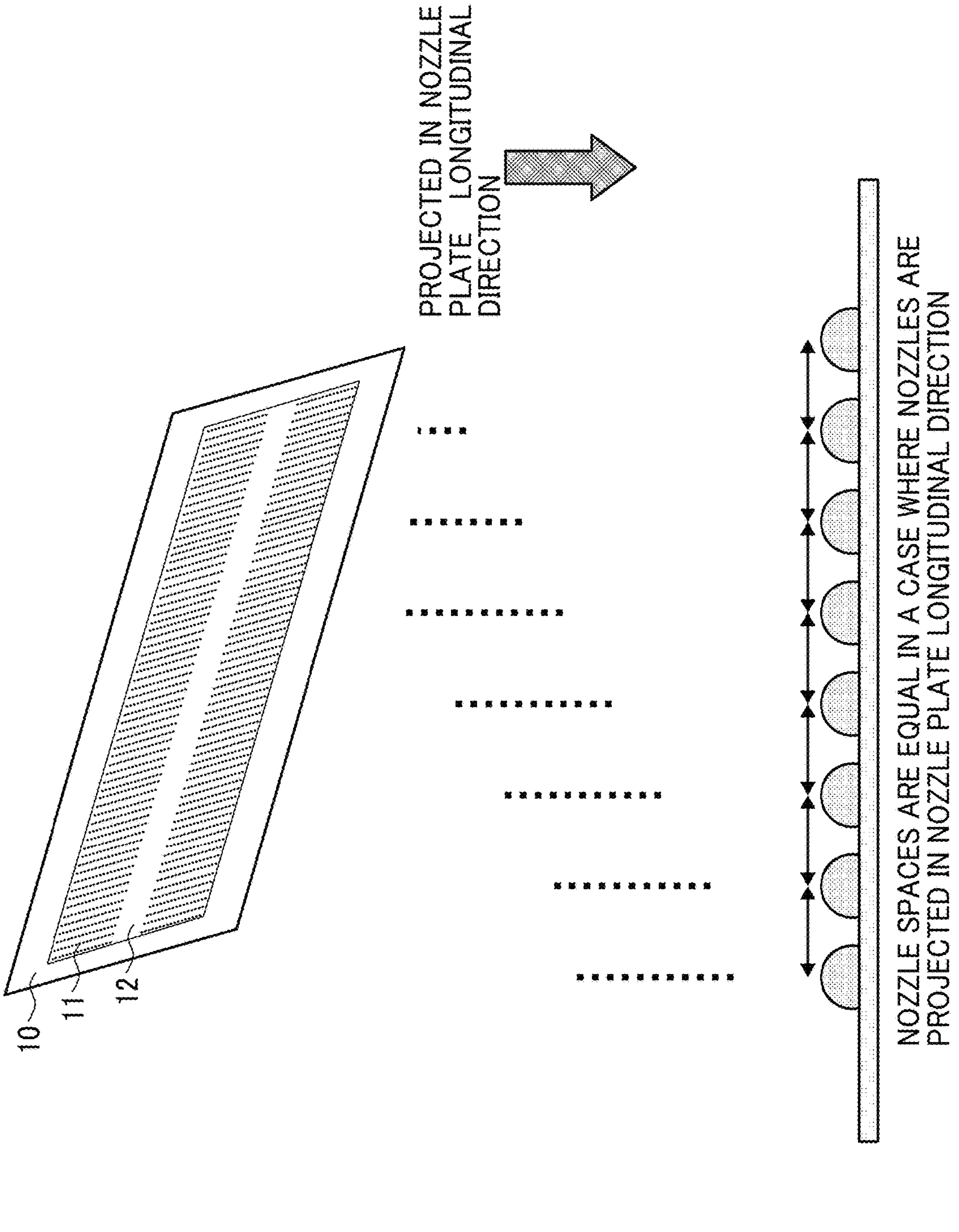
FIG. 13 is an explanatory diagram illustrating nozzle spaces.
Figure 14A:
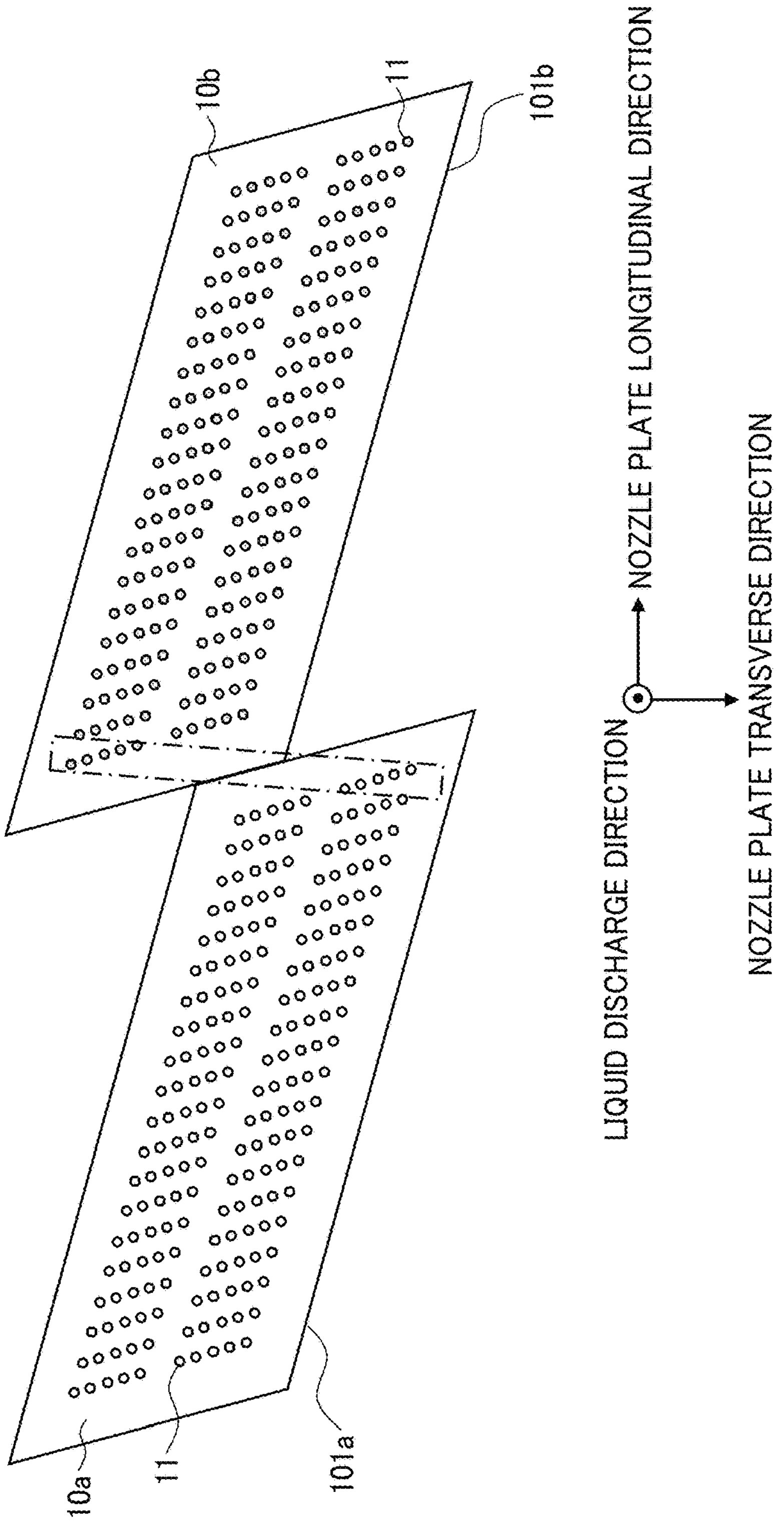
FIGS. 14A and 14B are explanatory diagrams of a head joint portion.
Figure 14B:

A first embodiment of the present embodiment will be described referring to FIGS. 10A and 10B to 14A and 14B. FIGS. 10A and 10B are explanatory diagrams of a head according to the first embodiment of the present embodiment. FIG. 10A is a schematic configuration diagram of the head. FIG. 10B is an enlarged view of a portion A illustrated in FIG. 10A. FIG. 11 is an explanatory diagram supplementing the relationship between the first embodiment and the comparative example. FIG. 12 is an explanatory diagram illustrating a state in which multiple the heads according to the first embodiment of the present embodiment is disposed. FIG. 13 is an explanatory diagram illustrating nozzle spaces. FIGS. 14A and 14B are explanatory diagrams of a head joint portion.

Since the basic configuration of a head 1 is as described in FIG. 2, the same elements are denoted by the same reference numerals, and the description will be omitted here. In FIGS. 10A and 10B, a nozzle plate 10 is a parallelogram having nozzle plate short sides e inclined at an angle θ1' relative to a nozzle plate transverse direction and nozzle plate long sides f inclined at an angle θ2' relative to a nozzle plate longitudinal direction. In the present embodiment, the inclination of the angle θ1' corresponds to the inclination direction A (first inclination direction) illustrated in FIG. 6, and the inclination of the angle θ2' corresponds to the inclination direction B (second inclination direction). In the nozzle plate 10, multiple nozzles 11 is regularly and two-dimensionally arrayed.

Regarding the array of the nozzles, the multiple nozzles 11 is divided into two sub-nozzle groups SBN1 and SBN2 including multiple sub-nozzles. The multiple sub-nozzles belonging to each of the sub-nozzle groups SBN1 and SBN2 is arranged at predetermined d×P intervals in the nozzle plate longitudinal direction. The d×P spaces correspond to a recording resolution d and the number P of the sub-nozzle groups SBN1 and SBN2 (two in this example). The sub-nozzle groups SBN1 and SBN2 include sub-nozzle rows including multiple sub-nozzles at d×P intervals in the nozzle plate longitudinal direction and aligning in a direction of the angle θ1' (FIG. 6 gives a detail of the sub-nozzle rows).

In this case, a set of rows including the sub-nozzle rows of the two sub-nozzle groups aligning in a row along the direction of the angle θ1' is a nozzle row 11N. For example, in the array, N nozzles 11 constitute a nozzle row 11N, and multiple the nozzle rows 11N is provided in parallel to the nozzle plate short side e and at N×d intervals in the direction of the nozzle plate long side f.

In the configuration of the first embodiment, the angle θ2' of the head 1 (nozzle plate 10) relative to the nozzle plate longitudinal direction is set to a large angle as compared with the configuration of the comparative example. At this time, for a nozzle region 12 where the nozzles 11 are formed (region surrounded by a broken line), a gap D is secured at an end portion of the nozzle region 12 on the upstream side of the nozzle plate longitudinal direction (the left side in FIG. 10A), and at an end portion of the nozzle region 12 on the downstream side of the nozzle plate longitudinal direction (the right side in FIG. 10A). That is, the gap D is provided between the nozzle plate short side e and the nozzles 11 of the nozzle row 11N closest to one end side in the direction of the angle θ2', and the gap D is provided between the nozzle plate short side e and the nozzles 11 of the nozzle row 11N closest to the other end side in the direction of the angle θ2'.

As illustrated in FIG. 10B, the length of the gap D in the direction of the angle θ2' (inclination direction B) is equal to or longer than a nozzle row 11N alignment space X, and a sufficient space is obtained for the edges (nozzle plate short sides e) of the nozzle plate 10. In the configuration of the first embodiment, the angles of a parallelogram forming the nozzle region 12 are the same as the angles of the parallelogram forming the outer shape of the nozzle plate 10.

The reason of the length of the gap D in the inclination direction B being equal to or larger than the nozzle row 11N alignment space X is due to, for example, the sizes of liquid chambers, partition walls, and the like installed at both ends of the nozzle plate 10. For example, in a case where the sizes of the liquid chambers and the partition walls are each half the nozzle row 11N alignment space, a gap D equal to or larger than X is provided between the endmost nozzles 11 (nozzle row 11N) and an edge of the nozzle plate 10, as illustrated in FIG. 10B. For example, in a case where partition walls for protecting liquid chambers are arranged at the end portions of the nozzle plate 10 in the nozzle plate longitudinal direction, the length of the gap D in the nozzle plate longitudinal direction is preferably 1.5× or more of the nozzle row 11N alignment space. This gap D suppresses damage given by an impact applied to the head end portions, to the nozzles and the liquid chambers at the end portions of the nozzle region 12.

As described above, in the first embodiment, the angle θ2' of the nozzle plate 10 relative to the nozzle plate longitudinal direction is set to a large angle as compared with the comparative example. That is, as illustrated in FIG. 11, in a nozzle plate 10R of the comparative example, a nozzle plate long side and a straight line in the nozzle plate longitudinal direction form an angle θ2. In the nozzle plate 10 of the first embodiment, a nozzle plate long side and a straight line in the nozzle plate longitudinal direction form the angle θ2' larger than the angle θ2 of the comparative example. The angle formed by a nozzle plate short side and a straight line in the nozzle plate transverse direction is equal in both the comparative example (angle θ1) and the first embodiment (angle θ1') (θ1=θ1'). Thus, in the first embodiment, the angle θ2' of a nozzle plate long side is larger than in the comparative example while the angle of the nozzle arrangement (nozzle rows) and the angle θ1' of a nozzle plate short side are the same as in the comparative example.

In the first embodiment, the nozzles 11 are arrayed such that in a case where multiple the heads 1 is disposed in the nozzle plate longitudinal direction, as illustrated in FIG. 12, less than 90% of a nozzle region 12*a* and less than 90% of a nozzle region 12*b* of a nozzle plate 10*a* and a nozzle plate 10*b* that are adjacent to each other overlap (FIG. 12 exemplifies a configuration in which there is no overlap). That is, in the nozzle plate 10*a* and the nozzle plate 10*b*, less than 90% of the nozzle region 12*b* overlaps an extension region that is a region to which the nozzle region 12*a* of the nozzle plate 10*a* is extended in the above-described inclination direction B.

According to the above configuration, since regions of the nozzle region 12*a* and the nozzle region 12*b* that overlap are smaller (or eliminated), direct contact between the nozzle plates 10*a* and 10*b* at a joint portion between the heads 1*a* and 1*b* is reduced (or eliminated). As a result, when an impact is applied from the outside, the collision area between the adjacent heads 1*a* and 1*b* is smaller, and damage to the nozzle plates 10*a* and 10*b* due to the impact is suppressed.

FIG. 13 is an explanatory diagram illustrating nozzle spaces in the head of the present embodiment. In FIG. 13, illustration of a nozzle plate holder 102 constituting the head 1 is omitted, and only the nozzle plate 10 is illustrated.

In the nozzle plate 10, the nozzles 11 are arranged such that nozzle spaces between the nozzles 11 are equal in a case where the nozzles 11 are projected on a line in the nozzle plate longitudinal direction.

FIGS. 14A and 14B are explanatory diagrams of a head joint portion. FIG. 14A is a schematic view of a case where multiple the heads is disposed. FIG. 14B is a nozzle schematic view of the head joint portion.

As described above, the nozzle spaces are equal in a case where the nozzles are projected on the nozzle plate longitudinal direction. Therefore, in a case where the multiple heads is disposed, at a joint portion indicated by a dashed-dotted line in FIG. 14A, nozzles projected from a head 1*a* and nozzles projected from a head 1*b* are alternately arranged, as illustrated in FIG. 14B. As a result, the nozzles are not interrupted at the joint portion, and a uniform recording resolution is continuously obtained.

As described above, the present embodiment is the head 1 including the nozzle plate 10 in which the multiple nozzles 11 that discharges liquid is arranged. The multiple nozzles 11 is divided into the two sub-nozzle groups SBN1 and SBN2 including the multiple sub-nozzles. The multiple sub-nozzles is arranged in the longitudinal direction of the nozzle plate 10 at predetermined (d×P) intervals that correspond to the recording resolution (d) and the number (P) of the sub-nozzle groups SBN1 and SBN2. The sub-nozzle groups SBN1 and SBN2 include the sub-nozzle rows 11*sb*1 and 11*sb*2, respectively. The sub-nozzle rows 11*sb*1 and 11*sb*2 include the multiple sub-nozzles that is at (d×P) intervals in the nozzle plate longitudinal direction, and aligns in the inclination direction A inclined relative to the nozzle plate longitudinal direction and the nozzle plate transverse direction orthogonal to the nozzle plate longitudinal direction. Sets of rows that include the sub-nozzle rows 11*sb*1 and 11*sb*2 of the two sub-nozzle groups SBN1 and SBN2, and align in a row along the inclination direction Aare defined as the nozzle rows 11N. In the nozzle plate 10, the nozzle rows 11N including the N nozzles 11 are arranged along the inclination direction B that is a direction different from the inclination direction A and is inclined relative to the nozzle plate longitudinal direction and the nozzle plate transverse direction. The nozzle rows 11N are arranged at predetermined X intervals in the inclination direction B. For each of the multiple nozzles 11, the distance, in the inclination direction B, between the nozzle 11 and an edge of the nozzle plate 10 on one end side of the nozzle plate longitudinal direction is X or more, and the distance, in the inclination direction B, between the nozzle 11 and an edge of the nozzle plate 10 on the other end side of the nozzle plate longitudinal direction is X or more.

As a result, the nozzle rows 11N are easily arrayed regularly with a certain number of (N) nozzles 11 for each nozzle row 11N. Further, the gap D having a length equal to or longer than X is provided at both end portions of the nozzle plate 10, so that the robustness is secured and damage due to an impact from the outside is reduced.

As described above, the distance, in the inclination direction B, between the nozzles 11 and an edge of the nozzle plate 10 on one end side of the nozzle plate longitudinal direction is 1.5× or more, and the distance, in the inclination direction B, between the nozzles 11 and an edge of the nozzle plate 10 on the other end side of the nozzle plate longitudinal direction is 1.5× or more.

As a result, partition walls or the like for protecting liquid chambers are allowed to be arranged at the end portions of the nozzle plate 10 in the nozzle plate longitudinal direction, and the robustness is more enhanced.

In the present embodiment, the multiple sub-nozzle groups is provided, so that the recording resolution of the head 1 is increased while the physical distance between the nozzles (distance between the nozzles 11 in the surface of the nozzle plate 10) is secured, as compared with a case where there is only one sub-nozzle group.

The heads may be configured such that the first sub-nozzle group SBN1 and the second sub-nozzle group SBN2 discharge liquids of different colors. The spaces, in the nozzle plate longitudinal direction, between the nozzles 11 arranged in a region of the nozzle plate 10 at the right end portion and/or the left end portion may be different from spaces, in the nozzle plate longitudinal direction, between the nozzles 11 arranged in a central region of the nozzle plate 10, as long as an image recorded on a medium is not substantially affected.

Second Embodiment

Figure 15B:
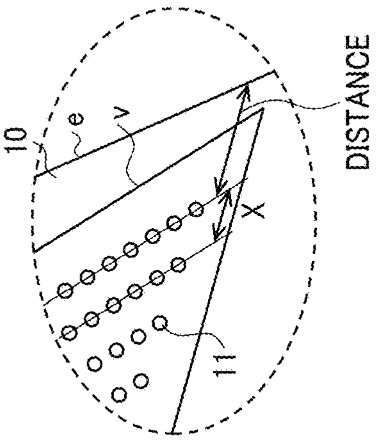
FIGS. 15A and 15B are explanatory diagrams of a head according to a second embodiment.
Figure 15A:
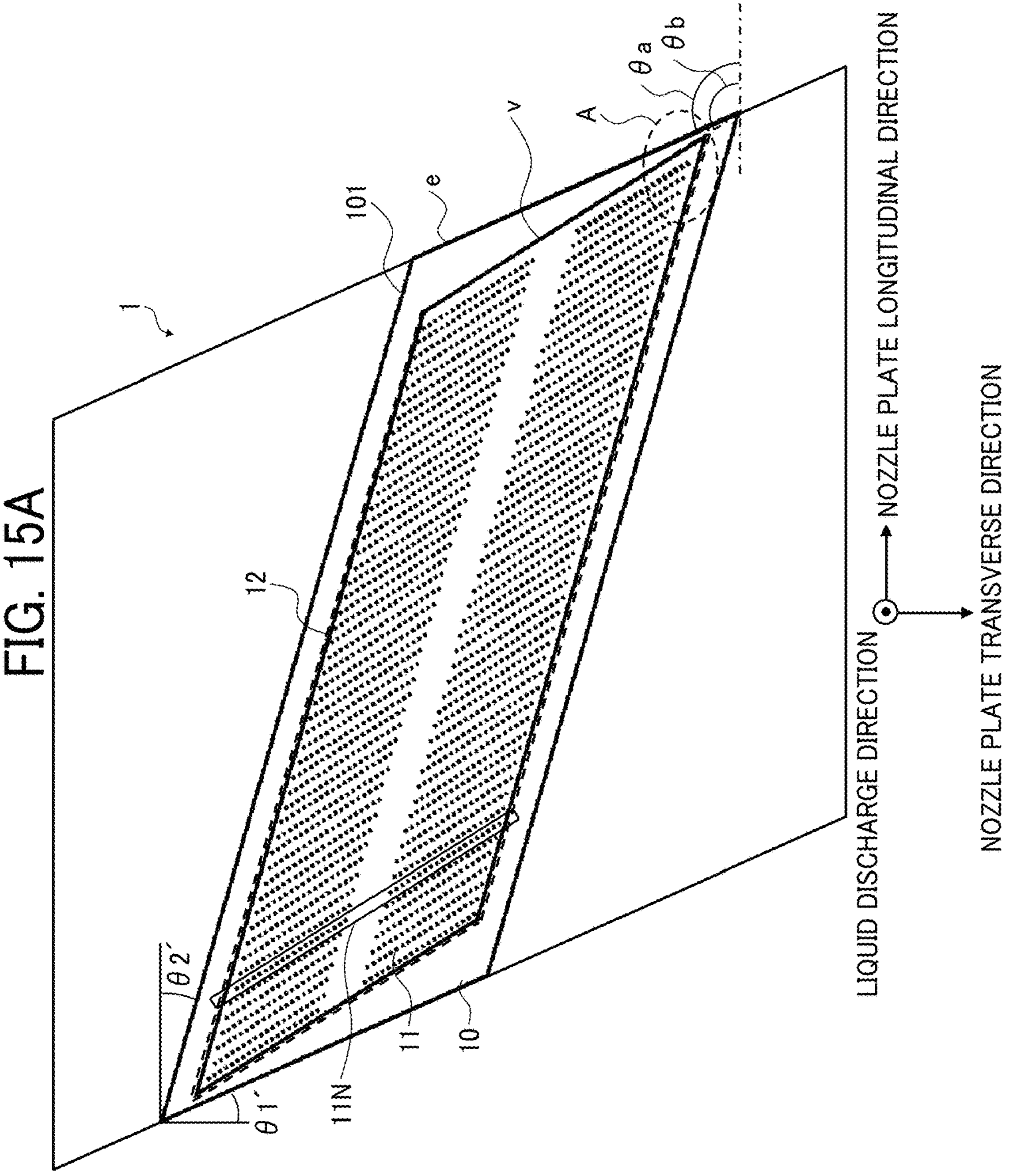
Figure 16:
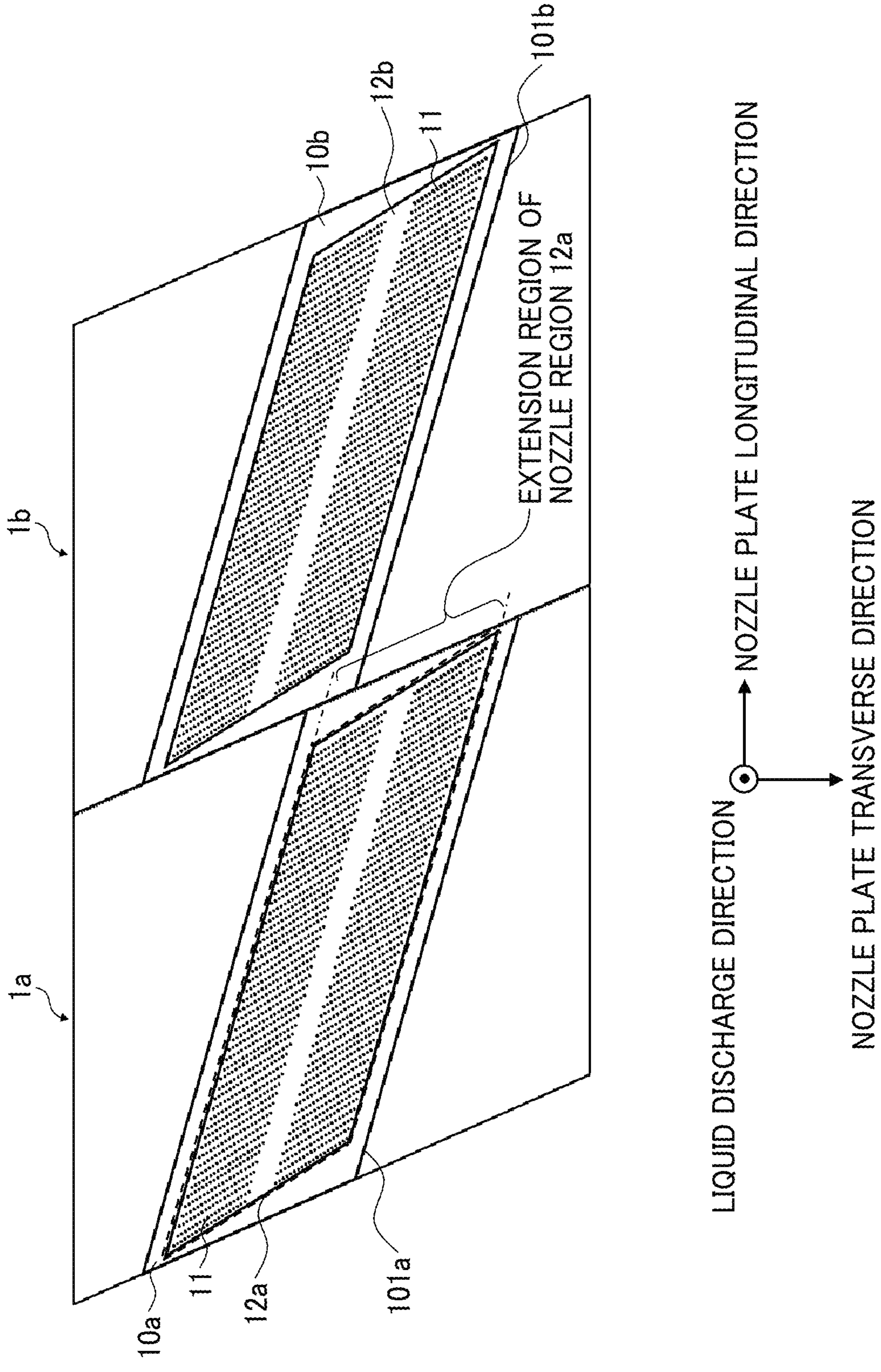
FIG. 16 is an explanatory diagram illustrating a state in which multiple the heads according to the second embodiment is disposed.

Next, a second embodiment of the present embodiment will be described referring to FIGS. 15A, 15B, and 16. FIGS. 15A and 15B are explanatory diagrams of a head according to the second embodiment of the present embodiment. FIG. 15A is a schematic configuration diagram of the head. FIG. 15B is an enlarged view of a portion A illustrated in FIG. 15A. FIG. 16 is an explanatory diagram illustrating a state in which multiple the heads according to the second embodiment of the present embodiment is disposed.

In the second embodiment, the layout of a nozzle region 12 relative to a nozzle plate 10 is different from the layout in the first embodiment. Specifically, in a case where an obtuse angle formed by an edge of the nozzle plate 10 on one end side of a nozzle plate longitudinal direction (a nozzle plate short side e) and a straight line in the nozzle plate longitudinal direction is θa (hereinafter referred to as a nozzle plate edge angle θa), and an obtuse angle formed by an imaginary line v extending in an inclination direction A of the nozzle region 12 and a straight line in the nozzle plate longitudinal direction is θb (hereinafter referred to as a nozzle region edge angle θb), the nozzle region 12 is provided such that the nozzle region edge angle θb is equal to or larger than the nozzle plate edge angle θa.

Thus, the nozzle region edge angle θb is set to a large angle, a wider gap is provided at both end portions in the nozzle plate longitudinal direction. As a result, in a case where an impact is applied to end portions of a head 1, the impact is less likely to be transmitted to nozzles 11 and liquid chambers located at end portions of the nozzle region 12.

Also in the second embodiment, the nozzles 11 are arrayed such that in a case where multiple the heads 1 is disposed in the nozzle plate longitudinal direction, as illustrated in FIG. 16, less than 90% of a nozzle region 12*a* of a head 1*a* and less than 90% of a nozzle region 12*b* of a head 1*b* overlap. As a result, the same effects as the effects of the first embodiment are obtained.

As described above, the present embodiment is configured such that in a case where an obtuse angle formed by the nozzle plate longitudinal direction and an edge of the nozzle plate 10 on one end side of the nozzle plate longitudinal direction is the nozzle plate edge angle θa, and an obtuse angle formed by the nozzle plate longitudinal direction and the imaginary line v extending in the inclination direction A is the nozzle region edge angle θb, the relationship of $\theta a \leq \theta b$ is satisfied.

As a result, a wider gap D is provided at both end portions of the nozzle plate 10 in the nozzle plate longitudinal direction, and an impact is less likely to be transmitted to end portions of the nozzle region 12.

[Distance of Nozzle Plate End Portions]

Figure 17:
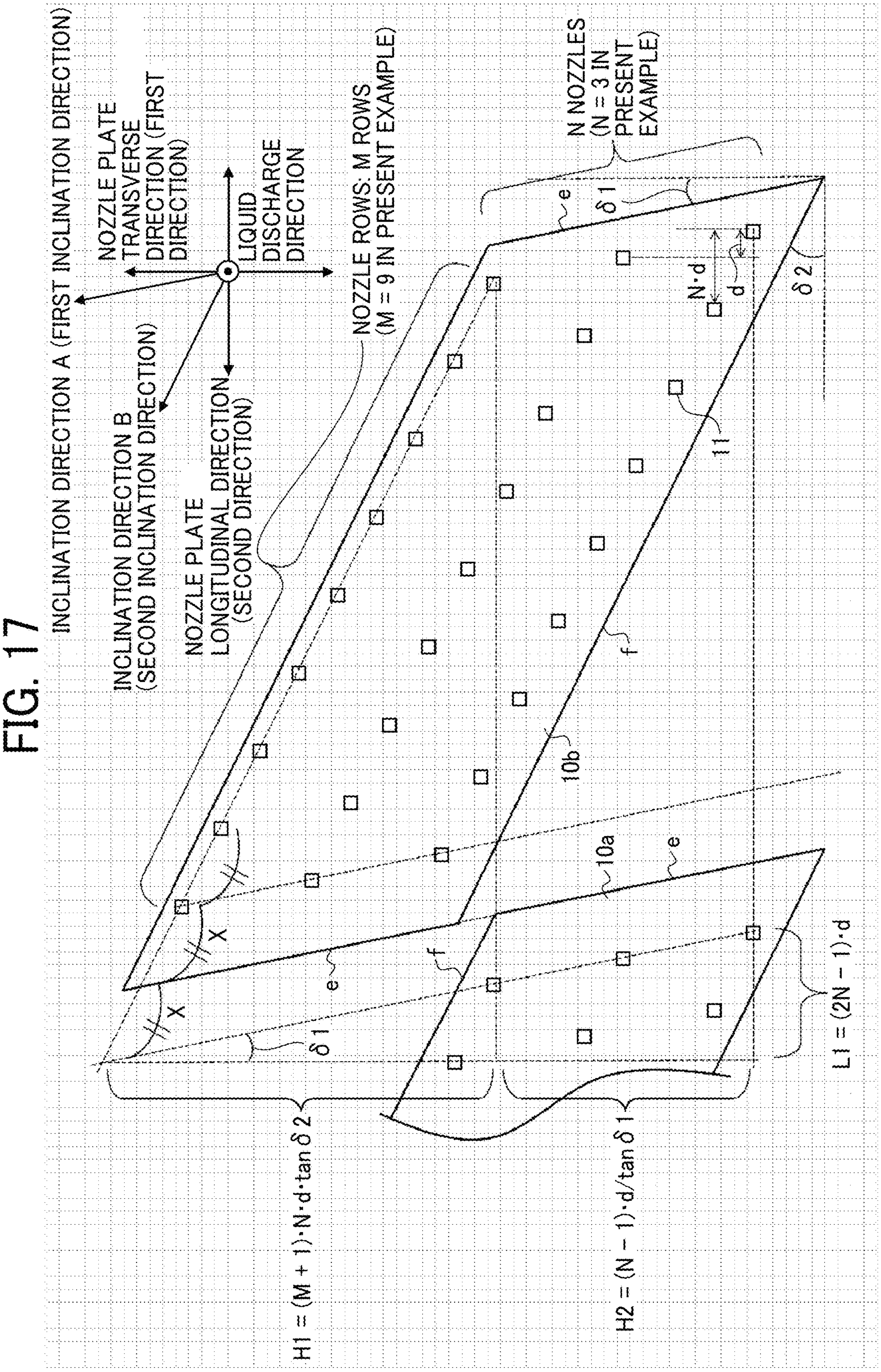
FIG. 17 is an explanatory diagram of the distance of nozzle plate end portions.

Next, a condition for securing a distance (space), in an inclination direction B, between the nozzle 11 in the nozzle plate 10 and the nozzle plate short side e of the nozzle plate 10, as a space of X or larger, will be described referring to FIG. 17. FIG. 17 is an explanatory diagram of the distance of nozzle plate end portions.

In FIG. 17, an acute angle formed by the transverse direction and the inclination direction A (first inclination direction, which is a direction in which the nozzles 11 in the nozzle row 11N align) is δ1, and an acute angle formed by the longitudinal direction and the inclination direction B (second inclination direction, which is a direction in which the nozzle rows 11N align) is δ2. In the example of the nozzle plate 10 illustrated in FIG. 17, δ1 corresponds to an acute angle formed by the nozzle plate transverse direction and an edge of the nozzle plate 10 on one end side of the nozzle plate longitudinal direction (nozzle plate short side e parallel to the inclination direction A). δ2 corresponds to an acute angle formed by the nozzle plate longitudinal direction and an edge of the nozzle plate 10 on one end side of the nozzle plate transverse direction (nozzle plate long side f parallel to the inclination direction B). In FIG. 17, the number of the nozzles included in the nozzle row 11N is N (N=3 is exemplified in FIG. 17), the number of the nozzle rows 11N is M (M=9 is exemplified in FIG. 17), and the spaces between the nozzles 11 in the nozzle plate longitudinal direction (recording resolution) is d.

One head (nozzle plate 10*a*) and the other head (nozzle plate 10*b*) are arranged so that the positions in the nozzle plate transverse direction are the same. In this case, the one head (nozzle plate 10*a*) and the other head (nozzle plate 10*b*) are adjacent to each other in such a manner that the nozzles included in the nozzle plate 10*a* and the nozzles included in the nozzle plate 10*b* regularly align at d intervals in the nozzle plate longitudinal direction. In this state, the nozzle rows have predetermined spaces X ($=N\cdot d/\cos\delta 2$) in the inclination direction B, as illustrated in an upper left portion of FIG. 17.

When a distance X, along the inclination direction B, from nozzles of an outermost nozzle row of the nozzle plate 10*a* or 10*b* to an edge of the nozzle plate (nozzle plate short side e) is provided, $\tan\delta 1=L1/(H1+H2)$ is satisfied for a right triangle indicated by a broken line. H1, H2, and L1 are such that $H1=(M+1)\cdot N\cdot d\cdot\tan\Omega$, $H2=(N-1)\cdot d/\tan\delta 1$, and $L1=(2N-1)\cdot d$, and thus $\delta 2=\arctan(1/((M+1)\tan\delta 1))$.

Therefore, δ2 is set such that $\delta 2\geq\arctan(1/((M+1)\tan\delta 1))$, the distance from the nozzles of the outermost nozzle row, to the nozzle plate short side e is surely X or longer.

As described above, in the present embodiment, δ2 is set to satisfy the relationship of $\delta 2\geq\arctan(1/((M+1)\tan\delta 1))$, where M is the number of the nozzle rows, δ1 is an acute angle formed by the nozzle plate transverse direction and the inclination direction A. and δ2 is an acute angle formed by the nozzle plate longitudinal direction and the inclination direction B.

As a result, the nozzles are arranged at regular intervals corresponding to the recording resolution while the nozzle plates are arranged in such a manner that the nozzle plates are moved parallel to each other in the nozzle plate longitudinal direction, and a distance of X or more is secured at the end portions, and damage to the nozzles and the like is prevented. In FIG. 17, a case where there is one sub-nozzle group (P=1) has been described as an example. However, even in a case where there are two or more sub-nozzle groups, δ2 is preferably set to satisfy the relationship of $\delta 2 \geq \arctan(1/((M+1)\tan \delta 1))$. Also in this case, for a reason similar to the reason in the above description, the nozzles are arranged at regular intervals while the nozzle plates are arranged in such a manner that the nozzle plates are moved parallel to each other, and a distance of X or more is secured at the end portions, and damage to the nozzles and the like is prevented.

Variation

In the above, a configuration in which the multiple heads 1 each including the one nozzle plate 10 is disposed to form the head unit 555 has been described. However, the number of nozzle plates 10 provided for one head 1 is not necessarily one. For example, one head 1 may include multiple nozzle plates 10, and in the one head 1, the multiple nozzle plates 10 may align in the nozzle plate longitudinal direction.

At this time, one of the nozzle plates 10 (first nozzle plate) and another one of the nozzle plates 10 (second nozzle plate) adjacent to each other in the nozzle plate longitudinal direction are arranged similarly to the case of FIGS. 14A and 14B. That is, the first nozzle plate and the second nozzle plate are arranged in such a manner that a portion is formed where nozzles of the first nozzle plate and nozzles of the second nozzle plate are arranged in such a manner that in a case where the nozzles of the first nozzle plate and the nozzles of the second nozzle plate are projected on the nozzle plate longitudinal direction, the nozzles of the first nozzle plate and the nozzles of the second nozzle plate are alternate.

As a result, the nozzles are not interrupted at a joint portion of the nozzle plates 10, and a uniform recording resolution is continuously obtained.

Alternatively, one of the nozzle plates 10 (first nozzle plate) and another one of the nozzle plates 10 (second nozzle plate) adjacent to each other in the nozzle plate longitudinal direction are arranged similarly to the case of FIG. 12 or 16. That is, the first nozzle plate and the second nozzle plate are arranged in such a manner that less than 90% of a nozzle region 12*b* of the second nozzle plate overlaps an extension region that is a region to which a nozzle region 12*a* of the first nozzle plate is extended in the inclination direction B (second inclination direction).

As a result, regions of the adjacent nozzle regions that overlap are smaller (or eliminated), and direct contact between the nozzle plates 10 is reduced (or eliminated). As a result, when an impact is applied from the outside, the collision area between the adjacent nozzle plates 10 is smaller, and damage to the nozzle plates 10 due to the impact is suppressed.

[Configuration of Protective Means]

Figure 18A:
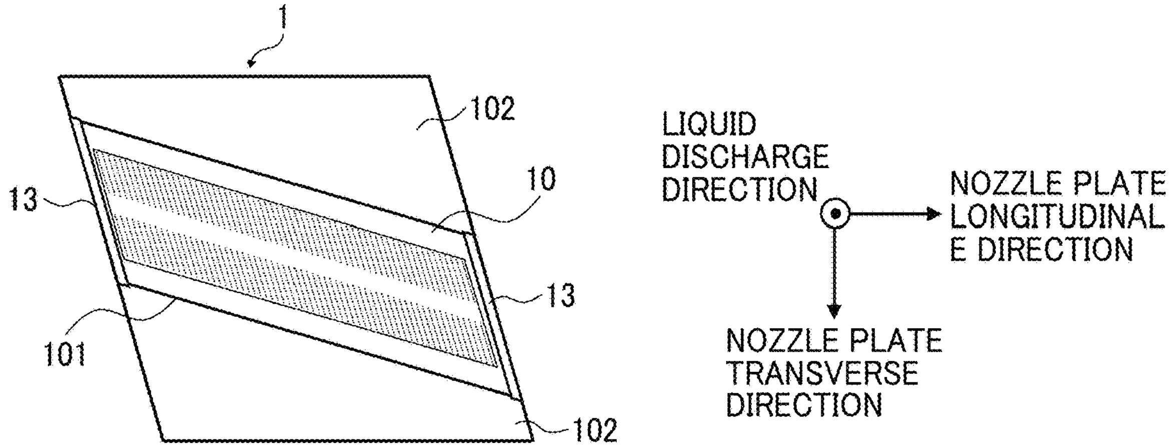
FIGS. 18A to 18C are explanatory diagrams illustrating examples of protective means.
Figure 18B:
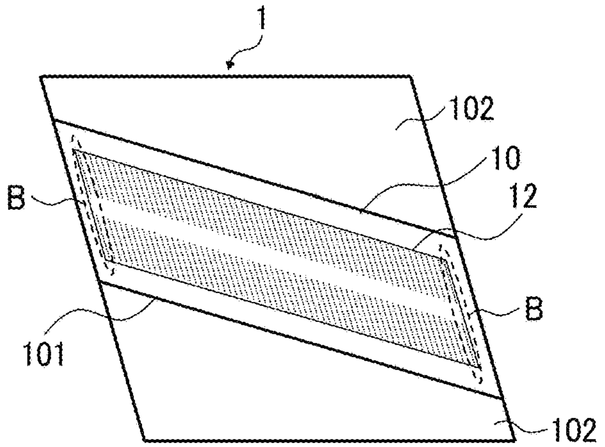
Figure 18C:
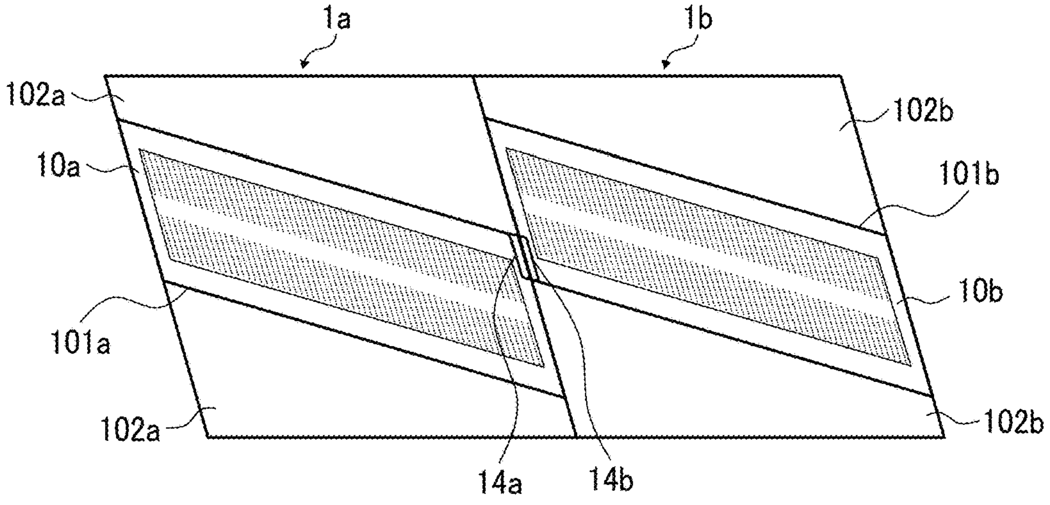

Next, protective means will be described referring to FIGS. 18A to 18C. FIGS. 18A to 18C are explanatory diagrams illustrating examples of the protective means. The heads 1 (1*a* and 1*b*) described in the first embodiment and the second embodiment may include the protective means described below.

In a head 1 illustrated in FIG. 18A, protectors 13 are provided at both end portions of a nozzle plate 10 in the nozzle plate longitudinal direction to protect edges of the nozzle plate 10. The protector 13 may be a fitted protective member (buffer material) made of a resin material that absorbs an impact from the outside, or may be a protective film formed by applying a resin material. The extent where the protectors 13 are provided is not limited to the extent of the edges of the nozzle plate 10. The extent where the protectors 13 are provided may be extended to edges of a nozzle plate holder 102 as necessary.

The protective means is not limited to a configuration that is seen from the appearance, such as the protectors 13 illustrated in FIG. 18A. In a head 1 illustrated in FIG. 18B, nozzles arranged at end portions B (broken-line portions) of a nozzle region 12 in the nozzle plate longitudinal direction are dummy nozzles. That is, among nozzles arranged at the end portions B, specific nozzles or a specific nozzle row is dummy nozzles, and the nozzles, which are not used in actual liquid discharge operation, are provided. The dummy nozzles are provided in this manner, so that the length of a gap D (see FIGS. 10A and 10B) of a nozzle plate 10 may be substantially adjusted.

In addition to multiple nozzles two-dimensionally arranged to obtain uniform recording resolution, one or multiple additional nozzles that discharges liquid may be further provided at the same position as the position of any one of the two-dimensionally arranged nozzles in the longitudinal direction. The number of the additional nozzles may be the same as the number of the multiple two-dimensionally arranged nozzles. In this case, for each of the multiple two-dimensionally arranged nozzles, it is sufficient if the distance, in the second inclination direction, between the nozzle and an edge of the nozzle plate on one end side in the longitudinal direction is X or more, and the distance, in the second inclination direction, between the nozzle and an edge of the nozzle plate on the other end side in the longitudinal direction is X or more, and the additional nozzles are provided at optional positions.

As illustrated in FIG. 18C, the protective means may be provided only at a portion where nozzle plates 10*a* and 10*b* are in contact with each other when multiple heads 1*a* and 1*b* is disposed. For example, the head 1*a* is provided with a protector 14*a* at a portion of the nozzle plate 10*a* adjacent to the nozzle plate 10*b* of the head 1*b* at an end portion of the nozzle plate 10*a* in the nozzle plate longitudinal direction. The head 1*b* is provided with a protector 14*b* at a portion of the nozzle plate 10*b* adjacent to the nozzle plate 10*a* of the head 1*a* at an end portion of the nozzle plate 10*b* in the nozzle plate longitudinal direction. The protector 14 may be a fitted protective member (buffer material) made of a resin material that absorbs an impact from the outside, or may be a protective film formed by applying a resin material, similarly to the protectors 13 of FIG. 18A.

The protective means as described above is added, so that the head 1 is more effectively protected from an impact from the outside, and the like.

Application Example First Application Example

A liquid discharge head of the present embodiment may also discharge liquid used to form a solid model. Examples of the liquid used to form a solid model include a hydrogel-forming material for forming a three-dimensional solid structure used for manual therapy training. The hydrogel-forming material contains water and a polymerizable monomer, preferably contains a mineral and an organic solvent, and, if necessary, further contains a polymerization initiator and other components. The polymerizable monomer is a compound having one or more unsaturated carbon-carbon bonds, and a polymerizable monomer polymerized by an active energy ray, such as an ultraviolet ray or an electron beam, is preferable.

Examples of the polymerizable monomer include a monofunctional monomer and a polyfunctional monomer. One type of the polymerizable monomer may be used alone, or two or more types of the polymerizable monomers may be used in combination. Examples of the polyfunctional monomer include a bifunctional monomer, a trifunctional monomer, and a tetra- or higher functional monomer.

The mineral is not particularly limited, and is appropriately selected according to the purpose. However, since the hydrogel contains water as a main component, a clay mineral is preferable, and further, a layered clay mineral that is uniformly dispersible at the level of primary crystals in water is preferable, and a water-swellable layered clay mineral is more preferable.

Examples of the organic solvent include a water-soluble organic solvent. The "water-soluble" of the water-soluble organic solvent means that the organic solvent is soluble in water in an amount of 30 mass % or more. The water-soluble organic solvent is not particularly limited, and is appropriately selected according to the purpose. Examples of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol, and tert-butyl alcohol; amides, such as dimethylformamide and dimethylacetamide; ketones or ketone alcohols, such as acetone, methyl ethyl ketone, and diacetone alcohol; ethers, such as tetrahydrofuran and dioxane; polyhydric alcohols, such as ethylene glycol, propylene glycol, 1,2-propanediol, 1,2-butanediol, 1,3-butanediol, 1,4-butanediol, diethylene glycol, triethylene glycol, 1,2,6-hexanetriol, thioglycol, hexylene glycol, and glycerin; polyalkylene glycols, such as polyethylene glycol and polypropylene glycol; lower alcohol ethers of polyhydric alcohols, such as ethylene glycol monomethyl (or ethyl) ether, diethylene glycol methyl (or ethyl) ether, and triethylene glycol monomethyl (or ethyl) ether; alkanolamines, such as monoethanolamine, diethanolamine, and triethanolamine; and N-methyl-2-pyrrolidone, 2-pyrrolidone, and 1,3-dimethyl-2-imidazolidinone.

One type of the water-soluble organic solvent may be used alone, or two or more types of the water-soluble organic solvents may be used in combination. Among them, polyhydric alcohols, such as glycerin and propylene glycol, are preferable, and glycerin and propylene glycol are more preferable from the viewpoint of moisture retaining property.

The polymerization initiator is not particularly limited, and is appropriately selected according to the purpose. Examples of the polymerization initiator include a photopolymerization initiator and a thermal polymerization initiator. As the photopolymerization initiator, any substance that generates radicals by irradiation with light (in particular, ultraviolet rays having a wavelength of 220 nm to 400 nm) is used. In a case where a solid modeling is performed using a hydrogel-forming material, an ultraviolet (UV) irradiation mechanism is provided, and the discharged hydrogel-forming material is cured by the UV irradiation.

[Specific Example of Hydrogel-Forming Material]

While 120.0 parts by mass of ion-exchanged water subjected to vacuum degassing for 30 minutes was stirred, 12.0 parts by mass of synthetic hectorite (Laponite® XLG manufactured by Rockwood Additives Ltd.) having a composition of $[Mg_{5.34}Li_{0.66}Si_8O_{20}(OH)_4]Na^-_{0.66}$ as a layered clay mineral was added little by little and stirred. Further, 0.6 parts by mass of etidronic acid (manufactured by Tokyo Chemical Industry Co., Ltd.) was added and stirred to prepare a dispersion liquid. To the obtained dispersion liquid, were added, as polymerizable monomers, 44.0 parts by mass of acryloylmorpholine (manufactured by KJ Chemicals Corporation) from which a polymerization inhibitor had been removed by passing the acryloylmorpholine through a column of activated alumina, and 0.4 parts by mass of methylene bisacrylamide (manufactured by Tokyo Chemical Industry Co., Ltd.). Further, 20.0 parts by mass of glycerin (manufactured by Sakamoto Yakuhin Kogyo Co., Ltd.) and 0.8 parts by mass of N,N,N',N'-tetramethylethylenediamine (manufactured by Tokyo Chemical Industry Co., Ltd.) were mixed to obtain a hydrogel-forming material.

Second Application Example

A liquid discharge head of the present embodiment may also be used in an inkjet method for arranging cells as desired to artificially form a tissue body containing the cells, and may discharge a cell suspension (cell ink). The cell suspension (cell ink) contains at least cells and a cell drying inhibitor. Furthermore, the cell suspension (cell ink) contains a dispersion medium in which cells are dispersed, and if necessary, may contain other additive materials, such as a dispersant and a pH adjusting agent.

The type and the like of the cells are not particularly limited, and are appropriately selected according to the purpose. Taxonomically, any cell, such as eukaryotic cells, prokaryotic cells, multicellular organism cells, and unicellular organism cells, is used. One type of the cells may be used alone, or two or more types of the cells may be used in combination.

Examples of the eukaryotic cells include animal cells, insect cells, plant cells, and fungi. One type of the eukaryotic cells may be used alone, or two or more types of the eukaryotic cells may be used in combination. Among them, animal cells are preferable, and in a case where the cells form a cell assembly, adhesive cells are more preferable. The adhesive cells have cell adhesiveness to such an extent that the cells adhere to each other and are not isolated unless the cells are subjected to a physicochemical treatment.

The cell drying inhibitor has a function of covering the surface of cells and inhibiting drying of cells. Examples of the cell drying inhibitor include polyhydric alcohols, gel-like polysaccharides, and proteins selected from extracellular matrices.

As the dispersion medium, a medium or buffer solution for cell culture is preferable. The medium is a solution that contains components necessary for the formation and maintenance of cell tissue bodies, prevents drying, and conditions an external environment, such as osmotic pressure, and anything known as a medium is appropriately selected and used. In a case where it is not necessary to constantly immerse the cells in the medium solution, the medium may be appropriately removed from the cell suspension. The buffer solution is for adjusting the pH according to the cells and purpose, and a known buffer solution is appropriately selected and used.

[Specific Example of Cell Suspension (Cell Ink)]

A green fluorescent dye (trade name: CellTracker Green™ manufactured by Life Technologies Corporation) was dissolved in dimethyl sulfoxide (hereinafter referred to as "DMSO") at a concentration of 10 mmol/L (mM), and mixed with serum-free Dulbecco's modified eagle medium (manufactured by Life Technologies Corporation) to prepare a green fluorescent dye-containing serum-free medium having a concentration of 10 μmol/L (μM). Next, 5 mL of the green fluorescent dye-containing serum-free medium was added to a dish of cultured NIH/3T3 cells (Clone 5611, JCRB Cell Bank), and the cells were cultured in an incubator (KM-CC17RU2 manufactured by Panasonic Corporation, 37° C., 5 vol % CO2 environment) for 30 minutes. The supernatant was then removed using an aspirator. To the dish, was added 5 mL of phosphate buffered saline (manufactured by Life Technologies Corporation, hereinafter also referred to as the PBS(−)), and the PBS(−) was sucked and removed with an aspirator to wash the surface. The washing operation with the PBS(−) was repeated twice, and then a 0.05 mass % trypsin-0.05 mass % ethylenediaminetetraacetic acid (EDTA) solution (manufactured by Life Technologies Corporation) was added in an amount of 2 mL per dish.

Next, the dish was warmed in the incubator for five minutes to detach the cells from the dish, and then 4 mL of D-MEM containing 10 mass % fetal bovine serum (hereinafter also referred to as "FBS") and 1 mass % antibiotic (Antibiotic-Antimycotic Mixed Stock Solution (100×) manufactured by NACALAI TESQUE, INC.) was added. Next, the cell suspension after deactivation of trypsin was transferred to one 50 mL centrifuge tube, centrifuged (trade name: H-19FM manufactured by KOKUSAN Co., Ltd., 1,200 rpm, 5 minutes, 5° C.), and the supernatant was removed using an aspirator.

After the removal, 2 mL of D-MEM containing 10 mass % FBS and 1 mass % antibiotic was added to the centrifuge tube, and gently pipetted to disperse the cells to obtain a cell suspension. A 10 μL portion of the cell suspension was taken out into an Eppendorf tube, 70 μL of a medium was added thereto, then a 10 μL portion of the cell suspension was taken out into another Eppendorf tube, 10 μL of a 0.4 mass % trypan blue stain was added thereto, and the mixture was pipetted. A 10 μL portion was removed from the stained cell suspension and placed on a poly(methyl methacrylate) (PMMA) plastic slide.

The number of cells was measured using Countess™ Automated Cell Counter (trade name, manufactured by Invitrogen Corporation) to determine the number of cells, to obtain a cell suspension in which the number of cells was measured. PBS(−) was used as a dispersion medium. Glycerin (molecular biology grade, manufactured by Wako Pure Chemical Industries, Ltd.) as a cell drying inhibitor was dissolved in the PBS(−) at a mass ratio of 0.5 mass %, and the NIH/3T3 cell suspension was dispersed in the dispersion medium at $6\times10^6$ cells/mL to obtain a cell ink.

According to the present embodiment, a liquid discharge head having excellent robustness and reducing damage due to an impact from the outside is provided.

[Aspect 1]

A liquid discharge head includes: a nozzle plate having multiple nozzles from each of which a liquid is to be discharged; and a gap in each end of the nozzle plate in a longitudinal direction of the nozzle plate, wherein the multiple nozzles are divided into P numbers of sub-nozzle groups, each of the sub-nozzle groups including the multiple nozzles as multiple sub-nozzles, where P is an integer of one or more, the multiple sub-nozzles are arrayed in the longitudinal direction at first intervals of d×P where d is a recording resolution and P is a number of the sub-nozzle groups, the sub-nozzle groups respectively include sub-nozzle rows respectively including the multiple sub-nozzles arrayed at the first intervals of d×P in the longitudinal direction, and each of the multiple sub-nozzles is arrayed in a first inclination direction inclined relative to the longitudinal direction and a transverse direction orthogonal to the longitudinal direction, and a set of the sub-nozzle rows of the P numbers of the sub-nozzle groups arrayed in one row in the first inclination direction form a nozzle row, multiple nozzle rows including the nozzle row are arrayed in a second inclination direction different from the first inclination direction and inclined relative to the longitudinal direction and the transverse direction, the multiple nozzle rows are arrayed at second intervals X in the second inclination direction, and the gap has: a first gap between one end of the nozzle plate in the longitudinal direction and each of the multiple nozzles adjacent to said one end of the nozzle plate, the first gap has a distance of X or more in the second inclination direction, and a second gap between another end of the nozzle plate in the longitudinal direction and each of the multiple nozzles adjacent to said another end of the nozzle plate, the second gap has a distance of X or more in the second inclination direction.

[Aspect 2]

In the liquid discharge head according to aspect 1, the first gap has the distance of 1.5× or more, and the second gap has the distance of 1.5× or more.

[Aspect 3]

In the liquid discharge head according to aspect 1, a nozzle plate edge angle θa is formed between the longitudinal direction and said one end of the nozzle plate in the longitudinal direction, and a nozzle region edge angle θb is formed between the longitudinal direction and the first inclination direction, the nozzle region edge angle θb equal to or larger than the nozzle plate edge angle θa, and each of the nozzle plate edge angle θa and the nozzle region edge angle θb is an obtuse angle.

[Aspect 4]

In the liquid discharge head according to aspect 1, the liquid discharge head comprises multiple nozzle plates including the nozzle plate, and the multiple nozzle plates are arrayed in the longitudinal direction.

[Aspect 5]

In the liquid discharge head according to aspect 4, the multiple nozzle plates include: a first nozzle plate; and a second nozzle plate adjacent to the first nozzle plate in the longitudinal direction, and the multiple sub-nozzles of the first nozzle plate and the multiple sub-nozzles of the second nozzle plate are arrayed alternately in the longitudinal direction at a joint portion between the first nozzle plate and the second nozzle plate.

[Aspect 6]

In the liquid discharge head according to aspect 4, the multiple nozzle plates include: a first nozzle plate; and a second nozzle plate adjacent to the first nozzle plate in the longitudinal direction, and an overlap region in which a nozzle region of the second nozzle plate overlaps an extension region extending a nozzle region of the first nozzle plate in the second inclination direction is less than 90%.

[Aspect 7]

In the liquid discharge head according to aspect 1, a relationship of $\delta2 \arctan(1/((M+1)\tan \delta1))$ is satisfied, where M is a number of the multiple nozzle rows, δ1 is an acute angle formed by the transverse direction and the first inclination direction, and δ2 is an acute angle formed by the longitudinal direction and the second inclination direction.

[Aspect 8]

A liquid discharge unit comprising multiple liquid discharge heads arrayed in the longitudinal direction, the multiple liquid discharge heads includes the liquid discharge head according to aspect 1.

[Aspect 9]

In the liquid discharge head according to aspect 8, the multiple liquid discharge heads include: a first liquid discharge head including a first nozzle plate, and a second liquid discharge head adjacent to the first liquid discharge head in the longitudinal direction, the second liquid discharge head including a second nozzle plate, and the multiple sub-nozzles of the first nozzle plate and the multiple sub-nozzles of the second nozzle plate are arrayed alternately in the longitudinal direction at a joint portion between the first liquid discharge head and the second liquid discharge head.

[Aspect 10]

In the liquid discharge unit according to aspect 8, the multiple liquid discharge heads include: a first liquid discharge head including a first nozzle plate; and a second liquid discharge head adjacent to the first liquid discharge head in the longitudinal direction, the second liquid discharge head including a second nozzle plate, and an overlap region in which a nozzle region of the second nozzle plate overlaps an extension region extending a nozzle region of the first nozzle plate in the second inclination direction is less than 90%.

[Aspect 11]

A liquid discharge apparatus comprising the liquid discharge head according to aspect 1, or the liquid discharge unit according to aspect 8.

In the embodiments of the present embodiment described above, constituent elements may be appropriately changed, added, and deleted without departing from the gist of the present embodiment. The present embodiment is not limited to the embodiments described above, and many modifications may be made by a person having ordinary knowledge in the field within the technical idea of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle plate having:

multiple nozzles from each of which a liquid is to be discharged; and a gap in each end of the nozzle plate in a longitudinal direction of the nozzle plate, wherein the multiple nozzles are divided into P numbers of sub-nozzle groups, each of the sub-nozzle groups including the multiple nozzles as multiple sub-nozzles, where P is an integer of one or more, the multiple sub-nozzles are arrayed in the longitudinal direction at first intervals of d×P where d is a recording resolution and P is a number of the sub-nozzle groups, the sub-nozzle groups respectively include sub-nozzle rows respectively including the multiple sub-nozzles arrayed at the first intervals of d×P in the longitudinal direction, and each of the multiple sub-nozzles is arrayed in a first inclination direction inclined relative to the longitudinal direction and a transverse direction orthogonal to the longitudinal direction, and a set of the sub-nozzle rows of the P numbers of the sub-nozzle groups arrayed in one row in the first inclination direction form a nozzle row, multiple nozzle rows including the nozzle row are arrayed in a second inclination direction different from the first inclination direction and inclined relative to the longitudinal direction and the transverse direction, the multiple nozzle rows are arrayed at second intervals X in the second inclination direction, and the gap has:

a first gap between one end of the nozzle plate in the longitudinal direction and each of the multiple nozzles adjacent to said one end of the nozzle plate, the first gap has a distance of X or more in the second inclination direction, and a second gap between another end of the nozzle plate in the longitudinal direction and each of the multiple nozzles adjacent to said another end of the nozzle plate, the second gap has a distance of X or more in the second inclination direction.

2. The liquid discharge head according to claim 1, wherein the first gap has the distance of 1.5× or more, and the second gap has the distance of 1.5× or more.

3. The liquid discharge head according to claim 1, wherein a nozzle plate edge angle θa is formed between the longitudinal direction and said one end of the nozzle plate in the longitudinal direction, and a nozzle region edge angle θb is formed between the longitudinal direction and the first inclination direction, the nozzle region edge angle θb equal to or larger than the nozzle plate edge angle θa, and each of the nozzle plate edge angle θa and the nozzle region edge angle θb is an obtuse angle.

4. The liquid discharge head according to claim 1, wherein the liquid discharge head comprises multiple nozzle plates including the nozzle plate, and the multiple nozzle plates are arrayed in the longitudinal direction.

5. The liquid discharge head according to claim 4, wherein the multiple nozzle plates include:

a first nozzle plate; and a second nozzle plate adjacent to the first nozzle plate in the longitudinal direction, and the multiple sub-nozzles of the first nozzle plate and the multiple sub-nozzles of the second nozzle plate are arrayed alternately in the longitudinal direction at a joint portion between the first nozzle plate and the second nozzle plate.

6. The liquid discharge head according to claim 4, wherein the multiple nozzle plates include:

a first nozzle plate; and a second nozzle plate adjacent to the first nozzle plate in the longitudinal direction, and an overlap region in which a nozzle region of the second nozzle plate overlaps an extension region extending a nozzle region of the first nozzle plate in the second inclination direction is less than 90%.

7. The liquid discharge head according to claim 1, wherein a relationship of $$\delta 2 \geq \arctan(1/((M+1)\tan\delta 1))$$

is satisfied, where M is a number of the multiple nozzle rows,

δ1 is an acute angle formed by the transverse direction and the first inclination direction, and δ2 is an acute angle formed by the longitudinal direction and the second inclination direction.

8. A liquid discharge unit comprising multiple liquid discharge heads arrayed in the longitudinal direction, the multiple liquid discharge heads includes the liquid discharge head according to claim 1.

9. The liquid discharge unit according to claim 8, wherein the multiple liquid discharge heads include:

a first liquid discharge head including a first nozzle plate; and a second liquid discharge head adjacent to the first liquid discharge head in the longitudinal direction, the second liquid discharge head including a second nozzle plate, and the multiple sub-nozzles of the first nozzle plate and the multiple sub-nozzles of the second nozzle plate are arrayed alternately in the longitudinal direction at a joint portion between the first liquid discharge head and the second liquid discharge head.

10. The liquid discharge unit according to claim 8, wherein the multiple liquid discharge heads include:

a first liquid discharge head including a first nozzle plate; and a second liquid discharge head adjacent to the first liquid discharge head in the longitudinal direction, the second liquid discharge head including a second nozzle plate, and an overlap region in which a nozzle region of the second nozzle plate overlaps an extension region extending a nozzle region of the first nozzle plate in the second inclination direction is less than 90%.

11. A liquid discharge apparatus comprising the liquid discharge unit according to claim 8.

12. A liquid discharge apparatus comprising the liquid discharge head according to claim 1.

* * * * *